(12) United States Patent
Sivaraman et al.

(10) Patent No.: US 11,743,153 B2
(45) Date of Patent: Aug. 29, 2023

(54) APPARATUS AND PROCESS FOR MONITORING NETWORK BEHAVIOUR OF INTERNET-OF-THINGS (IOT) DEVICES

(71) Applicant: NewSouth Innovations Pty Limited, Sydney (AU)

(72) Inventors: Vijay Sivaraman, Sydney (AU); Hassan Habibi Gharakheili, Sydney (AU); Mohammed Ayyoob Ahamed Hamza, Sydney (AU)

(73) Assignee: NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 17/309,679

(22) PCT Filed: Dec. 13, 2019

(86) PCT No.: PCT/AU2019/051374
§ 371 (c)(1),
(2) Date: Jun. 14, 2021

(87) PCT Pub. No.: WO2020/118377
PCT Pub. Date: Jun. 18, 2020

(65) Prior Publication Data
US 2022/0086070 A1 Mar. 17, 2022

(30) Foreign Application Priority Data
Dec. 14, 2018 (AU) ................. 2018904760

(51) Int. Cl.
*H04L 43/062* (2022.01)
*G16Y 40/35* (2020.01)
(Continued)

(52) U.S. Cl.
CPC .......... *H04L 43/062* (2013.01); *G06F 11/006* (2013.01); *G16Y 30/10* (2020.01);
(Continued)

(58) Field of Classification Search
CPC ..... H04L 43/062; H04L 43/026; H04L 43/04; H04L 47/2441; H04L 47/2483;
(Continued)

(56) References Cited

U.S. PATENT DOCUMENTS 9,094,444 B2 7/2015 Baltatu et al.
9,674,207 B2 6/2017 Di Pietro et al.
(Continued)

FOREIGN PATENT DOCUMENTS

WO WO 2005/017813 2/2005

OTHER PUBLICATIONS

Lear et al., "Manufacturer Usage Description Specification, draft-ietf-opsawg-mud-18", Network Working Group, Internet-Draft, Mar. 2, 2018, 59 pages. (Year: 2018).*

*Primary Examiner* — Austin J Moreau
*Assistant Examiner* — Chhian (Amy) Ling
(74) *Attorney, Agent, or Firm* — Knobbe, Martens, Olson & Bear, LLP

(57) ABSTRACT

A process for monitoring network behaviour of IoT devices, which includes: monitoring a communication network traffic to identify TCP and UDP traffic flows to and from each of one or more IoT devices; processing the identified traffic flows to generate a corresponding data structure representing the identified network traffic flows of the IoT device in terms of, for each of local and internet networks, one or more identifiers of respective hosts and/or devices that had a network connection with the IoT device, source and destination ports and network protocols; and comparing the generated data structure for each IoT device to corresponding data structures representing predetermined manufacturer usage description (MUD) specifications of known types of IoT devices to generate quantitative measures of similarity of the traffic flows of the IoT device to traffic flows defined (Continued)

by the predetermined MUD specifications to identify the type of the IoT device

26 Claims, 25 Drawing Sheets

(51) Int. Cl.
| | |
|---|---|
| *H04L 43/04* | (2022.01) |
| *H04L 47/2441* | (2022.01) |
| *H04L 47/2483* | (2022.01) |
| *H04L 67/12* | (2022.01) |
| *H04L 67/30* | (2022.01) |
| *H04W 28/02* | (2009.01) |
| *G16Y 40/10* | (2020.01) |
| *G16Y 30/10* | (2020.01) |
| *G06F 11/00* | (2006.01) |
| *H04L 43/026* | (2022.01) |
| *G16Y 40/50* | (2020.01) |

(52) U.S. Cl.
CPC .............. *G16Y 40/10* (2020.01); *G16Y 40/35* (2020.01); *H04L 43/026* (2013.01); *H04L 43/04* (2013.01); *H04L 47/2441* (2013.01); *H04L 47/2483* (2013.01); *H04L 67/12* (2013.01); *H04L 67/30* (2013.01); *H04W 28/0215* (2013.01); *G16Y 40/50* (2020.01)

(58) Field of Classification Search
CPC ..... H04L 67/12; H04L 67/30; H04L 63/1458; H04L 63/1466; H04L 2463/144; H04L 63/1425; H04L 63/1408; H04W 28/0215; G06F 11/006; G06F 16/9027; G06F 2201/875; G16Y 30/10; G16Y 40/10; G16Y 40/35; G16Y 40/50
See application file for complete search history.

(56) References Cited

U.S. PATENT DOCUMENTS

| | | | |
|---|---|---|---|
| 10,579,602 | B2 * | 3/2020 | Wang ................. G06F 16/215 |
| 2007/0063548 | A1 | 3/2007 | Eipper |
| 2008/0201278 | A1 | 8/2008 | Muller |
| 2011/0267964 | A1 | 11/2011 | Baltatu et al. |
| 2016/0028752 | A1 | 1/2016 | Di Pietro et al. |
| 2016/0203490 | A1 * | 7/2016 | Gupta ................ G06Q 20/4016 705/44 |
| 2016/0212099 | A1 * | 7/2016 | Zou .................... H04L 63/0263 |
| 2017/0063912 | A1 * | 3/2017 | Muddu ................ H04L 43/08 |
| 2018/0103056 | A1 | 4/2018 | Kohout et al. |
| 2018/0332053 | A1 * | 11/2018 | Weis ..................... H04L 63/20 |
| 2019/0005407 | A1 * | 1/2019 | Harris .................. G06N 3/0445 |
| 2019/0253319 | A1 * | 8/2019 | Kampanakis ....... H04L 41/0893 |
| 2020/0104509 | A1 * | 4/2020 | Furuichi ............. H04L 63/1433 |
| 2020/0177485 | A1 * | 6/2020 | Shurtleff ................. H04L 67/12 |

* cited by examiner

Figure 22

APPARATUS AND PROCESS FOR MONITORING NETWORK BEHAVIOUR OF INTERNET-OF-THINGS (IOT) DEVICES

TECHNICAL FIELD

The present invention relates to network security, and in particular security of networks that include Internet-of-things (IoT) devices, and more particularly to an apparatus and process for monitoring network behaviour of IoT devices.

BACKGROUND

Networked devices continue to become increasingly ubiquitous in a wide variety of settings, including businesses and other organisations, and domestic settings. In particular, the addition of network connectivity to sensors and appliance-type devices generally dedicated to a specific task has created a new class of devices and interconnectivity, generally referred to as forming an 'Internet-of-things', or simply 'IoT'. Thus examples of IoT devices include lightbulbs, doorbells, power switches, weight scales, security cameras, air conditioning equipment, home automation and voice-activated Internet interfaces in the general form of audio speakers (e.g., Google Home and Amazon Echo) and other 'smart' devices, including a wide variety of networked sensors most commonly used to sense environmental parameters such as temperature, humidity, motion, smoke and air quality.

There are now so many such devices available that their management has become challenging, particularly from a security standpoint, for large networks such as those found in large enterprises and university campuses, for example. Such networks may include literally thousands of such devices which largely remain unidentified and may pose significant security risks to the network. Most IoT devices are relatively simple, and cannot defend themselves from cyber attacks. Many connected IoT devices can be found on search engines such as Shodan, and their vulnerabilities exploited at scale. For example, a recent cyber attack on a casino relied upon compromised fish tank sensors, and a recent attack on a university campus network relied upon networked vending machines. Dyn, a major DNS provider, was subjected to a DDoS attack originating from a large IoT botnet comprising thousands of compromised IP-cameras. Thus IoT devices, exposing TCP/UDP ports to arbitrary local endpoints within a home or enterprise, and to remote entities on the wider Internet, can be used by inside and outside attackers to reflect/amplify attacks and to infiltrate otherwise secure networks.

It is desired to overcome or alleviate one or more difficulties of the prior art, or to at least provide a useful alternative.

SUMMARY

In accordance with some embodiments of the present invention, there is provided a process for monitoring network behaviour of Internet of Things (IoT) devices, the process including the steps of:
monitoring network traffic of a communications network to identify TCP and UDP network traffic flows to and from each of one or more IoT devices of the communications network;
processing the identified network traffic flows of each IoT device to generate a corresponding data structure for each IoT device representing the identified network traffic flows of the IoT device in terms of, for each of local and internet networks, one or more identifiers of respective hosts and/or devices that had a network connection with the IoT device, source and destination ports and network protocols; and
comparing the generated data structure for each IoT device to corresponding data structures representing predetermined manufacturer usage description (MUD) specifications of known types of IoT devices to generate, for each IoT device, quantitative measures of similarity of the traffic flows of the IoT device to traffic flows defined by the predetermined MUD specifications to identify the type of the IoT device and/or to determine whether the traffic flows of the IoT device conform to expected behaviour of the known types of IoT devices.

In some embodiments, the data structure is a tree structure with branches respectively representing network traffic to the IoT device and from the IoT device, and for each branch of the tree structure, one or more sub-branches, each said sub-branch representing a corresponding network address name, Ethernet frame EtherType, Internet Protocol number, and port number.

In some embodiments, the tree structure branches respectively represent network traffic to Internet, from Internet, to local network and from local network.

In some embodiments, the process includes compacting the generated data structure for an IoT device by combining branches of the tree structure of the generated data structure based on intersections between the branches and one or more corresponding branches of one or more corresponding data structures representing respective predetermined MUD specifications of respective known types of IoT devices.

In some embodiments, the data structure is a tree structure with branches respectively representing network traffic to Internet, from Internet, to local network and from local network, and for each said branch, one or more sub-branches, each said sub-branch representing a corresponding network address name, Ethernet frame EtherType, Internet Protocol number, and port number.

In some embodiments, the quantitative measures of similarity include dynamic similarity scores according to:

$$sim_d(R, M_i) = \frac{|R \cap M_i|}{|R|},$$

where R represents the generated data structure for the IoT device following removal of any redundant rules, and $M_i$ represents the corresponding data structures representing predetermined manufacturer usage description (MUD) specifications of known types of IoT devices.

In some embodiments, the quantitative measures of similarity include static similarity scores according to:

$$sim_s(R, M_i) = \frac{|R \cap M_i|}{|M_i|},$$

where R represents the generated data structure for the IoT device following removal of any redundant rules, and $M_i$ represents the corresponding data structures representing predetermined manufacturer usage description (MUD) specifications of known types of IoT devices.

In some embodiments, the process includes periodically repeating the steps of monitoring, processing and comparing to generate data representing the quantitative measures of similarity as a function of time.

In some embodiments, the process includes generating an alert if network traffic behaviour of an IoT device changes substantially over time.

In some embodiments, the processed network traffic flows of each IoT device do not include SSDP flows.

In some embodiments, the step of comparing includes independently generating the quantitative measures of similarity for the IoT device for each of local network and Internet channels to identify the type of the IoT device, and only if the type of the IoT device identified for the channels do not agree, then generating quantitative measures of similarity for the IoT device for an aggregate of the local network channel and the Internet channel to identify the type of the IoT device.

In accordance with some embodiments of the present invention, there is provided an apparatus for monitoring network behaviour of Internet of Things (IoT) devices configured to execute the process of any one of the above processes.

In accordance with some embodiments of the present invention, there is provided at least one computer-readable storage medium having stored thereon executable instructions and/or FPGA configuration data that, when the instructions are executed by at least one processor and/or when an FPGA is configured in accordance with the FPGA configuration data, cause the at least one processor and/or the FPGA to execute the device classification process of any one of the above processes.

In accordance with some embodiments of the present invention, there is provided a n apparatus for monitoring network behaviour of Internet of Things (IoT) devices, including:

a network traffic monitor to monitor network traffic of a communications network to identify TCP and UDP network traffic flows to and from each of one or more IoT devices of the communications network;

an IoT device identifier to process the identified network traffic flows of each IoT device to generate a corresponding data structure for each IoT device representing the identified network traffic flows of the IoT device in terms of, for each of local and internet networks, one or more identifiers of respective hosts and/or devices that had a network connection with the IoT device, source and destination ports and network protocols; and an anomaly detector to compare the generated data structure for each IoT device to corresponding data structures representing predetermined manufacturer usage description (MUD) specifications of known types of IoT devices to generate, for each IoT device, quantitative measures of similarity of the traffic flows of the IoT device to traffic flows defined by the predetermined MUD specifications to identify the type of the IoT device and/or to determine whether the traffic flows of the IoT device conform to expected behaviour of the known types of IoT devices.

In some embodiments, the data structure is a tree structure with branches respectively representing network traffic to the IoT device and from the IoT device, and for each branch of the tree structure, one or more sub-branches, each said sub-branch representing a corresponding network address name, Ethernet frame EtherType, Internet Protocol number, and port number.

In some embodiments, the tree structure branches respectively represent network traffic to Internet, from Internet, to local network and from local network.

In some embodiments, the apparatus includes a data structure compacting component configured to compact the generated data structure for an IoT device by combining branches of the tree structure of the generated data structure based on intersections between the branches and one or more corresponding branches of one or more corresponding data structures representing respective predetermined MUD specifications of respective known types of IoT devices.

In some embodiments, the data structure is a tree structure with branches respectively representing network traffic to Internet, from Internet, to local network and from local network, and for each said branch, one or more sub-branches, each said sub-branch representing a corresponding network address name, Ethernet frame EtherType, Internet Protocol number, and port number.

In some embodiments, the quantitative measures of similarity include dynamic similarity scores according to:

$$sim_d(R, M_i) = \frac{|R \cap M_i|}{|R|},$$

where R represents the generated data structure for the IoT device following removal of any redundant rules, and $M_i$ represents the corresponding data structures representing predetermined manufacturer usage description (MUD) specifications of known types of IoT devices.

In some embodiments, the quantitative measures of similarity include static similarity scores according to:

$$sim_s(R, M_i) = \frac{|R \cap M_i|}{|M_i|},$$

where R represents the generated data structure for the IoT device following removal of any redundant rules, and $M_i$ represents the corresponding data structures representing predetermined manufacturer usage description (MUD) specifications of known types of IoT devices.

In some embodiments, the apparatus is configured to periodically repeat the steps of monitoring, processing and comparing to generate data representing the quantitative measures of similarity as a function of time.

In some embodiments, the apparatus includes an alert generator configured to generate an alert if network traffic behaviour of an IoT device changes substantially over time.

In some embodiments, the processed network traffic flows of each IoT device do not include SSDP flows.

In some embodiments, the anomaly detector is configured to independently generate the quantitative measures of similarity for the IoT device for each of local network and Internet channels to identify the type of the IoT device, and only if the type of the IoT device identified for the channels do not agree, to generate quantitative measures of similarity for the IoT device for an aggregate of the local network channel and the Internet channel to identify the type of the IoT device.

BRIEF DESCRIPTION OF THE DRAWINGS

Some embodiments of the present invention are hereinafter described, by way of example only, with reference to the accompanying drawings, wherein:

FIG. 11 represents a canonical set of rules generated by horizontal partitioning of the aggregate polygon defined by the rule sets of FIGS. 9 and 10;

FIG. 22 is a partial confusion matrix showing the relationship between predicted labels of 28 different IoT devices and true labels of three IoT devices;

DETAILED DESCRIPTION

Figure 1:
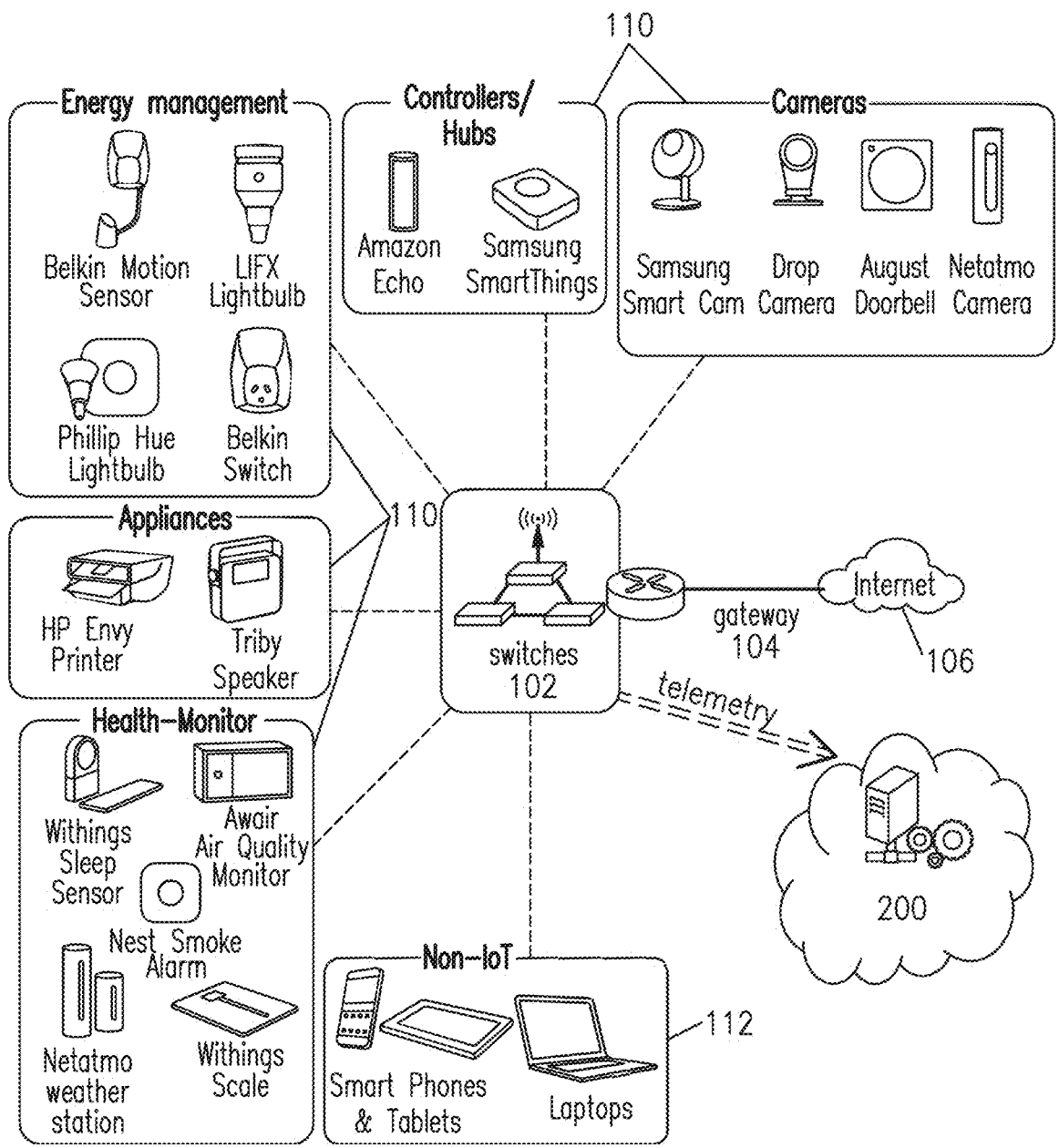
FIG. 1 is a schematic diagram of a communications network including Internet of Things (IoT) devices and an apparatus for monitoring network behaviour of the IoT devices.

The security concerns described above have prompted standards bodies to provide guidelines for the Internet community to build secure IoT devices and services, and for regulatory bodies (such as the US FCC) to control their use. In particular, an IETF proposal named the "Manufacturer Usage Description" (MUD) Specification provides the first formal framework for IoT behaviour that can be rigorously enforced. This framework requires manufacturers of IoTs to publish a behavioural profile of their device, as they are the ones with the best knowledge of how their device will behave when installed in a network. For example, an IP camera may need to use DNS and DHCP on the local network, and communicate with NTP servers and a specific cloud-based controller in the Internet, but nothing else. However, such requirements vary significantly across IoTs from different manufacturers. Knowing each device's requirements would allow network operators to impose a tight set of access control list (ACL) restrictions on each IoT device in operation so as to reduce the potential attack surface of their networks.

The IETF MUD proposal provides a light-weight model to enforce effective baseline security for IoT devices by allowing a network to auto-configure the required network access for the devices, so that they can perform their intended functions without having unrestricted network privileges.

However, MUD is a new and emerging paradigm, and the IETF MUD Specification is still evolving as a draft. Accordingly, IoT device manufacturers have not yet provided MUD profiles for their devices, and moreover there is little collective wisdom today on how manufacturers should develop behavioural profiles of their IoT devices, or how organizations should use MUD profiles to secure their networks or monitor the runtime behaviour of IoT devices.

To address these difficulties, the inventors have developed apparatuses and processes for securing computer networks that include "Internet-of-Things" (IoT) devices. As described herein, the apparatuses and processes process network traffic of a communications network to:

(i) automatically generate a corresponding MUD profile for each IoT device in the network; and (ii) periodically assess whether the run-time network behaviour of each IoT device is consistent with its corresponding MUD profile, and to detect changes to its network behaviour that may be indicative of a security attack.

In one example described below, the apparatuses and processes were applied to a testbed network including 28 distinct IoT devices, capturing the network behaviour of the IoT devices over a period of six months and processing the resulting data to identify, inter alia:

(a) legacy IoT devices without vendor MUD support;
(b) IoT devices with outdated firmware; and
(c) IoT devices that are potentially compromised.

In one aspect, described herein is an apparatus and process that help IoT manufacturers generate and verify MUD profiles, taking as input a network packet trace representing the operational behaviour of an IoT device, and generating as output a MUD profile for it.

In another aspect, also described herein is an apparatus and process for monitoring network behaviour of IoT devices, using observed traffic traces and known MUD signatures to dynamically identify IoT devices and monitor their behavioural changes within a network.

As shown in FIG. 1, a communications network includes one or more interconnected network switches 102 and a gateway 104 that provides access to a wide area network 106 such as the Internet. The switches 102 provide wired and wireless access to the network for network devices, including IoT devices 110 and non-IoT devices 112. The non-IoT devices 112 typically include computing devices such as desktop and portable general purpose computers, tablet computers, smart phones and the like.

Figure 2:
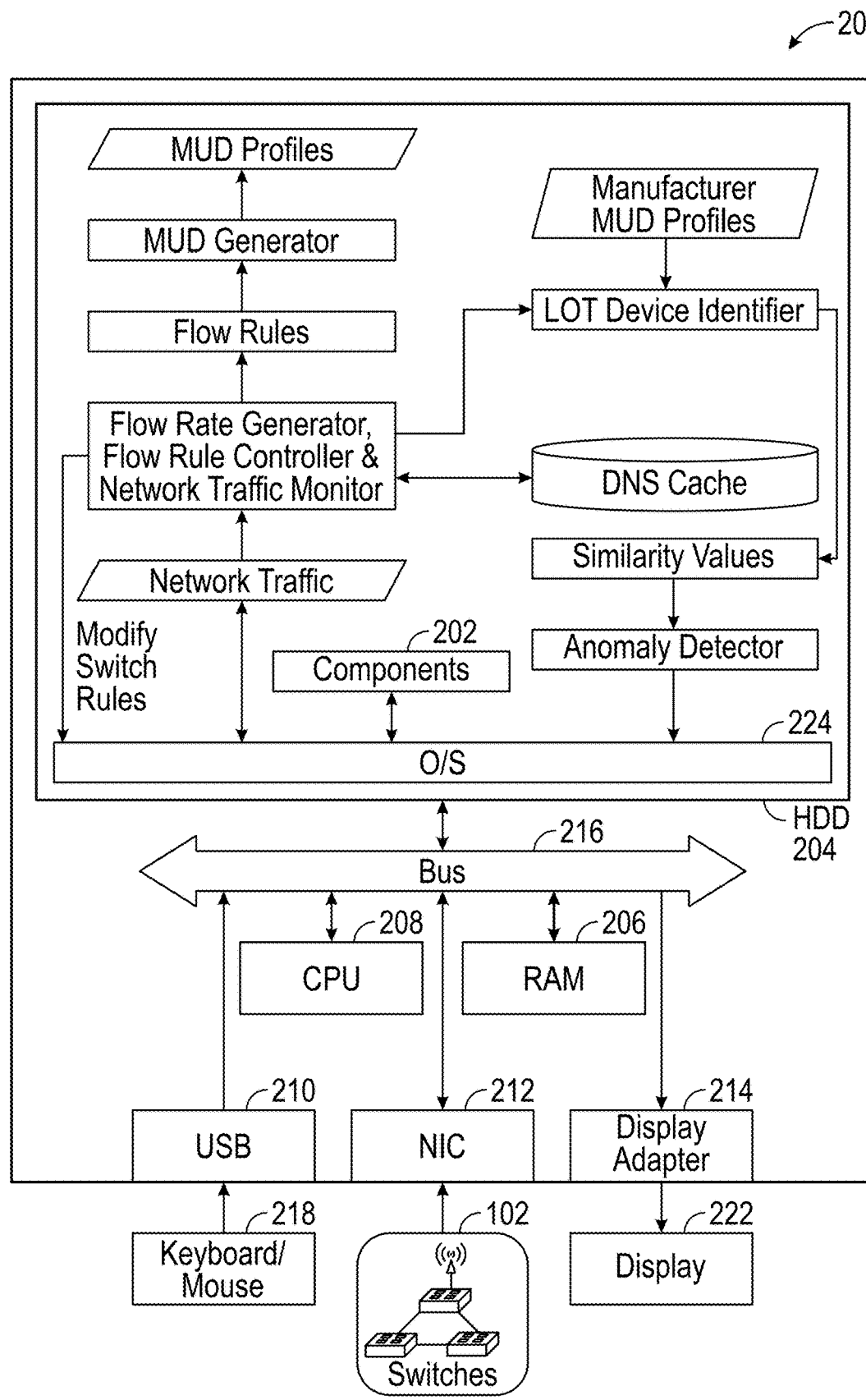
FIG. 2 is a block diagram of a system for assessing network behaviour of Internet of Things (IoT) devices in accordance with an embodiment of the present invention.
Figure 3:
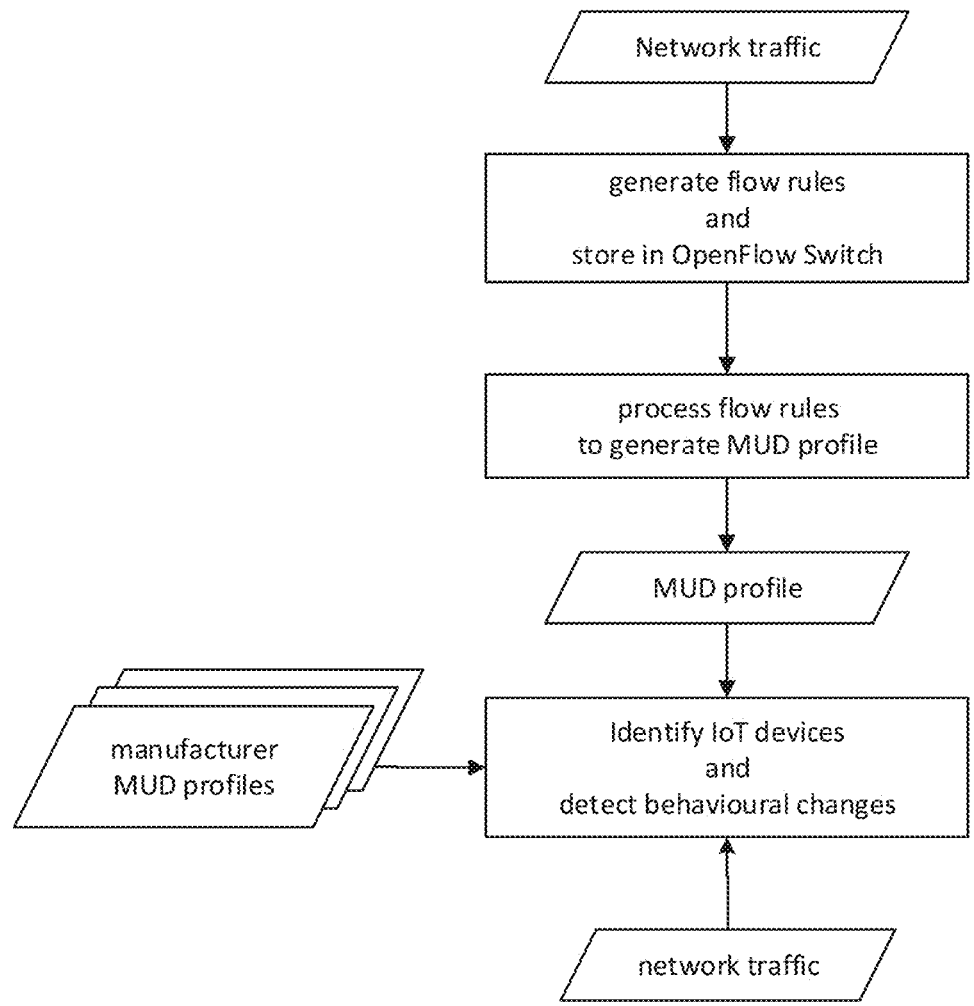
FIG. 3 is a flow diagram of a process for assessing network behaviour of Internet of Things (IoT) devices in accordance with an embodiment of the present invention.

In accordance with the described embodiments of the present invention, the communications network also includes an apparatus 200 for monitoring network behaviour of IoT devices (also referred to herein as the "IoT monitoring apparatus" 200), as shown in FIG. 2, that executes a process 300 for monitoring network behaviour of IoT devices (also referred to herein as the "IoT monitoring process" 300), as shown in FIG. 3, to dynamically identify network devices as being instances of known IoT device types, and to monitor the network behaviour of these devices to detect any changes in network behaviour that may be indicative of an attack.

In the described embodiments, the switches 102 are OpenFlow switches under control of an SDN controller of the apparatus 200. However, it will be apparent to those skilled in the art that other embodiments of the present invention may be implemented using other types of network switches to identify and quantify network traffic flows of networked devices.

As shown in FIG. 2, in the described embodiments the IoT monitoring process 300 is implemented in the form of executable instructions of software components or modules 202 stored on a non-volatile storage medium 204 such as a solid-state memory drive (SSD) or hard disk drive (HDD). However, it will be apparent to those skilled in the art that at least parts of the process 300 can alternatively be implemented in other forms, for example as configuration data of a field-programmable gate arrays (FPGA), and/or as one or more dedicated hardware components, such as application-specific integrated circuits (ASICs), or any combination of these forms.

In the described embodiment, the IoT monitoring process components 202 include a network traffic monitor, an IoT device identifier, and an anomaly detector. The IoT monitoring apparatus 200 includes random access memory (RAM) 206, at least one processor 208, and external interfaces 210, 212, 214, all interconnected by at least one bus 216. The external interfaces include a network interface connector (NIC) 212 which connects the apparatus 200 to the network switches 102 network, and may include universal serial bus (USB) interfaces 210, at least one of which may be connected to a keyboard 218 and a pointing device such as a mouse 219, and a display adapter 214, which may be connected to a display device such as a panel display 222.

The IoT monitoring apparatus 200 also includes an operating system 224 such as Linux or Microsoft Windows, and an SDN or 'flow rule' controller such as the Ryu framework, (RYU SDN Framework). Although the network device management components 202 and the flow rule controller are shown as being hosted on a single operating system 224 and hardware platform, it will be apparent to those skilled in the art that in other embodiments the flow rule controller may be hosted on a separate virtual machine or hardware platform with a separate operating system.

I—MUD Profile Generation

The inventors have developed an apparatus or 'tool' named "MUDgee" to automatically generate a MUD profile for an IoT device from its network traffic trace in order to make the creation of MUD profiles faster, cheaper and more accurate.

A valid MUD profile contains a root object in the form of an "access-lists" container which includes several access control entries (ACEs) serialized in JSON (JavaScript Object Notation) format. The access-lists are explicit in describing the direction of communication, from-device and to-device. Each ACE matches traffic on source/destination port numbers for TCP/UDP, and type and code for ICMP. The MUD specifications also distinguish local-networks traffic from Internet communications.

In one example described further below, traffic flows of each IoT device were captured over a six month observation period, and the set of collected flows were then processed to automatically generate MUD rules. The rules reflect an application whitelisting model (i.e., only 'allow' rules with a default action of 'drop'). Having a combination of 'accept' and 'drop' rules requires a notion of rule priority (i.e., order), and is not supported by the current IETF MUD draft. For example, Table 1 below summarises the traffic flows observed for a Blipcare blood pressure monitor, which only generates traffic whenever it is used.

The Blipcare blood pressure monitor first resolves its intended server at tech.carematrix.com by exchanging a DNS query/response with the default gateway (i.e., the top two flows). It then uploads its measurement to its server operating on TCP port 8777 (described by the bottom two rules).

TABLE 1 flow rules generated from a MUD profile of a Blipcare blood pressure monitor IoT device

| Source | Destination | proto | sPort | dPort |
|---|---|---|---|---|
| * | 192.168.1.1 | 17 | * | 53 |
| 192.168.1.1 | * | 17 | 53 | * |
| * | tech.carematix.com | 6 | * | 8777 |
| tech.carematix.com | * | 6 | 8777 | * |

MUDgee Architecture

MUDgee implements a programmable virtual switch (vSwitch) with a packet header inspection engine attached. It plays an input PCAP trace (of an arbitrary IoT device) into the switch. MUDgee includes:

(i) a flow rule generator that captures and tracks all TCP/UDP flows to/from each device to generate corresponding flow rules, and (ii) a MUD profile generator that generates a MUD profile from the flow rules.

Network Traffic Flow Capture

Consumer IoT devices use services provided by remote servers on the cloud, and also expose services to local hosts (e.g., a mobile App). The flow rule generator tracks (intended) device activities using separate flow rules for remote and local communications.

Figure 4:
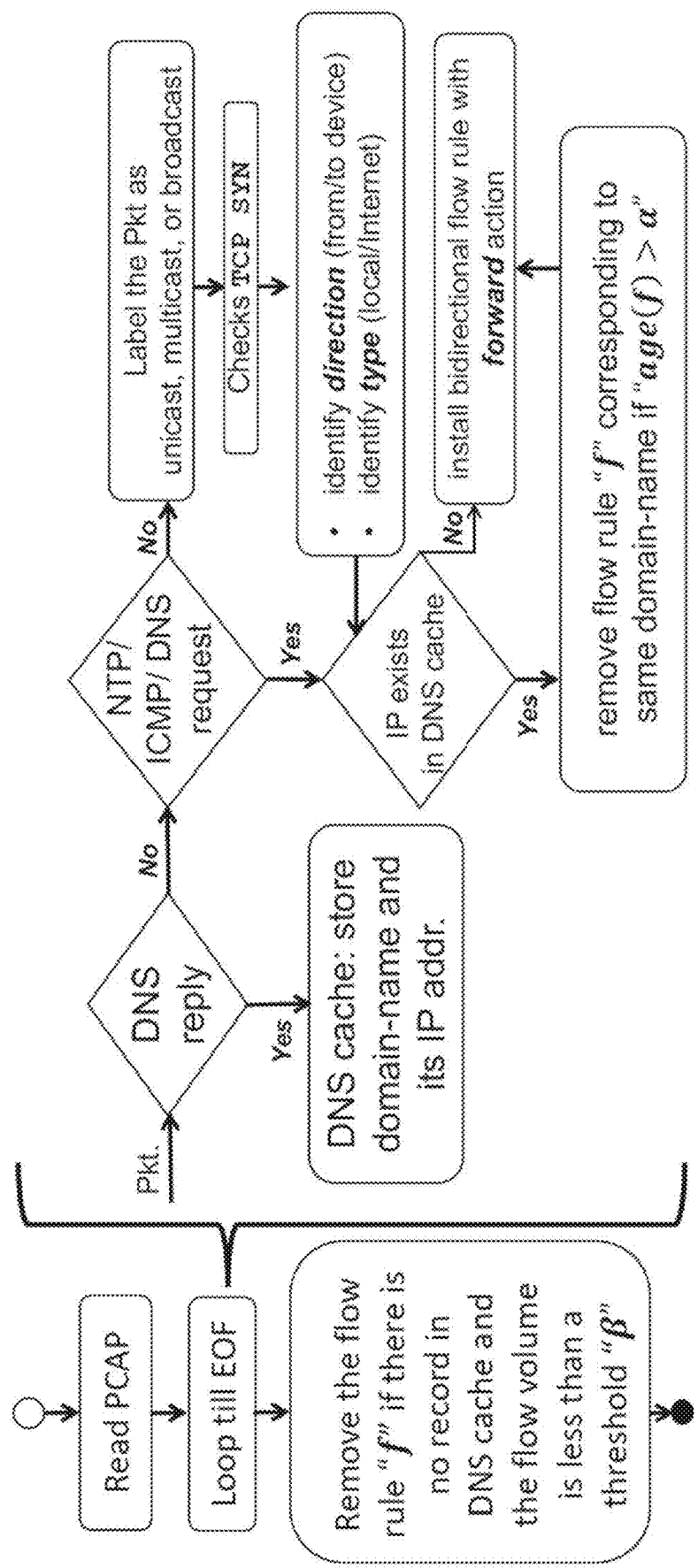
FIG. 4 is a flow diagram of a flow rule generation process of the process of FIG. 3.

It is challenging to capture services (especially those operating on non-standard TCP/UDP ports) that a device is either accessing or exposing. This is because local/remote services operate on static port numbers, whereas source port numbers are dynamic (and chosen randomly) for different flows of the same service. It is trivial to deduce the service for TCP flows by inspecting the SYN flag, but not so easy for UDP flows. FIG. 4 is a flow diagram of a flow capture process executed by the flow rule generator to capture bidirectional traffic flows of an IoT device.

The vSwitch is first configured with a set of proactive rules, each with a specific action ("forward" or "mirror") and a priority, as shown in Table 2 below

TABLE 2

Initial proactive rules

| id | sEth | dEth | typeEth | Source | Destination | proto | sPort | dPort | priority | action |
|---|---|---|---|---|---|---|---|---|---|---|
| a | <gwMAC> | <devMAC> | 0x0800 | * | * | 1 | * | * | 100 | foward |
| b.1 | <devMAC> | <gwMAC> | 0x0800 | * | * | 1 | * | * | 100 | mirror |
| b.2 | <devMAC> | <gwMAC> | 0x86dd | * | * | 58 | * | * | 100 | mirror |
| c | <gwMAC> | <devMAC> | 0x0800 | * | * | 17 | 123 | * | 100 | forward |
| d.1 | <gwMAC> | <devMAC> | * | * | * | 17 | 53 | * | 100 | mirror |
| d.2 | <devMAC> | <gwMAC> | * | * | * | 17 | * | 53 | 100 | mirror |
| e.1 | * | <devMAC> | 0x0806 | * | * | * | * | * | 100 | forward |
| e.2 | <devMAC> | * | 0x0806 | * | * | * | * | * | 100 | forward |
| f | <gwMAC> | <devMAC> | * | gw local IP | * | * | * | * | 90 | forward |
| g | <devMAC> | <gwMAC> | * | * | gw local IP | * | * | * | 90 | forward |
| h | <devMAC> | * | 0x888e | * | * | * | * | * | 3 | forward |
| i | <devMAC> | * | * | * | * | * | * | * | 2 | mirror |
| j | * | <devMAC> | * | * | * | * | * | * | 2 | mirror |

Proactive rules with a 'mirror' action feed the header inspection engine with a copy of the matched packets. The flow capture process of FIG. 4 inserts a corresponding reactive rule into the vSwitch.

The flow capture process matches a DNS reply packet to a top priority flow, and extracts and stores the domain name and its associated IP address into a DNS cache table. This DNS cache is dynamically updated upon arrival of a DNS reply matching an existing request.

The MUD specification also requires the segregation of traffic to and from a device for both local and Internet communications. Hence the flow capture process assigns a unique priority to the reactive rules associated with each of the groups: from-local, to-local, from-Internet and to-Internet. A specific priority is used for flows that contain a TCP SYN to identify whether the IoT device or the remote entity initiated the communication.

Flow Translation to MUD

The MUD profile generator processes the flow rules generated by analysing the traffic flows to generate a corresponding MUD profile for each device based on the considerations below.

Consideration 1: perform a reverse lookup of the IP address of the remote endpoint and identify the associated domain name (if any), using the DNS cache.

Consideration 2: Some consumer IoTs, especially IP cameras, typically use the STUN protocol to verify that the user's mobile app can stream video directly from the camera over the Internet. If a device uses the STUN protocol over UDP, the profile must allow all UDP traffic to/from Internet servers because the STUN servers often require the client device to connect to different IP addresses or port numbers.

Consideration 3: it is observed that several smart IP cameras communicate with many remote servers operating on the same port (e.g., the Belkin Wemo switch). However, no DNS responses were found corresponding to the server IP addresses. So, the device must obtain the IP address of its servers via a non-standard channel (e.g., the current server may instruct the device with the IP address of the subsequent server). If a device communicates with several remote IP addresses (in the described embodiment, more than a threshold value of five), all operating on the same port, then remote traffic to/from any IP addresses (i.e., *) is allowed on that specific port number.

Consideration 4: Some devices (e.g., TPLink plug) use the default gateway as the DNS resolver, and others (e.g., Belkin WeMo motion) continuously ping the default gateway. The draft MUD Specification maps local communication to fixed IP addresses through the controller construct. The local gateway is considered to act as the controller, and the name-space urn:ietf:params:mud:gateway is used for the gateway.

In this way, MUD profiles were generated for the 28 consumer IoT devices listed in Table 4 below.

TABLE 3

List of 28 IoT devices for which MUD profiles were automatically generated.

| Type | IoT device |
|---|---|
| Camera | Netatmo Welcome, Dropcam, Withings Smart Baby Monitor, Canary camera, *TP-Link Day Night Cloud camera, August doorbell camera, Samsung SmartCam, Ring doorbell, Belkin NetCam* |
| Air quality sensors | Awair air quality monitor, Nest smoke sensor, Netatmo weather station |
| Healthcare devices | Withings Smart scale, Blipcare Blood Pressure meter, Withings Aura smart sleep sensor |
| Switches and Triggers | iHome power plug, WeMo power switch, TPLink plug, Wemo Motion Sensor |
| Lightbulbs | Philips Hue lightbulb, LiFX bulb |
| Hub | Amazon Echo, SmartThings |
| Multimedia | Chromecast, Triby Speaker |
| Other | HP printer, Pixstar Photoframe, Hello Barbie |

Devices with purely static functionality are shown in bold.
Devices with static functionality that is loosely defined (e.g., due to the use of the STUN protocol) are italicised.
Devices with complex and dynamic functionality are underlined.

Insights and Challenges

The Blipcare BP monitor is an example of an IoT device with static functionalities. It exchanges DNS queries/responses with the local gateway, and communicates with a single domain name over TCP port 8777. Consequently, its behaviour can be locked down to a limited set of static flow rules. The majority of IoT devices that were tested (i.e., 22 out of 28) fall into this category (listed in a bold typeface in Table 3).

Figure 5:
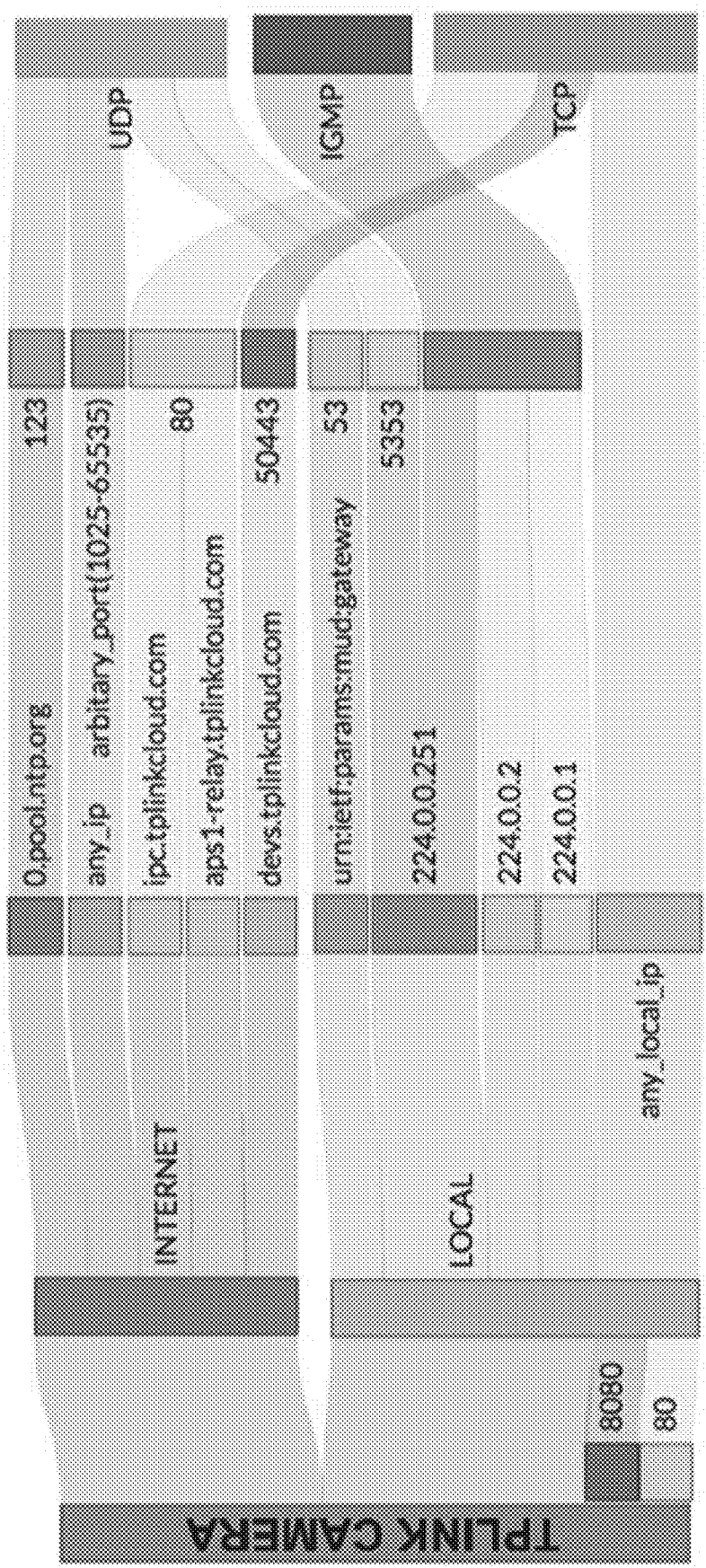
FIGS. 5 and 6 are Sankey diagrams of MUD profiles of, respectively, a TP-Link camera IoT device, and an Amazon Echo IoT device.
Figure 6:
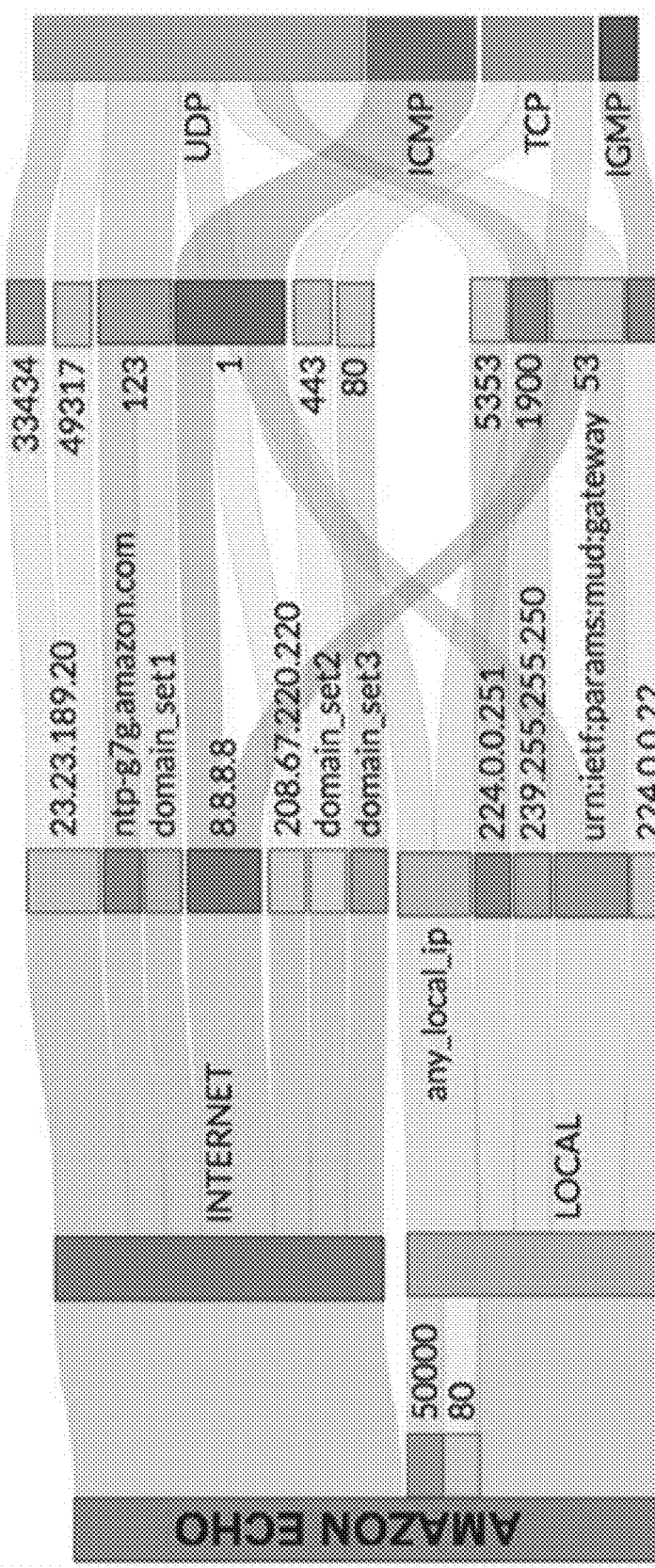
Figure 7:
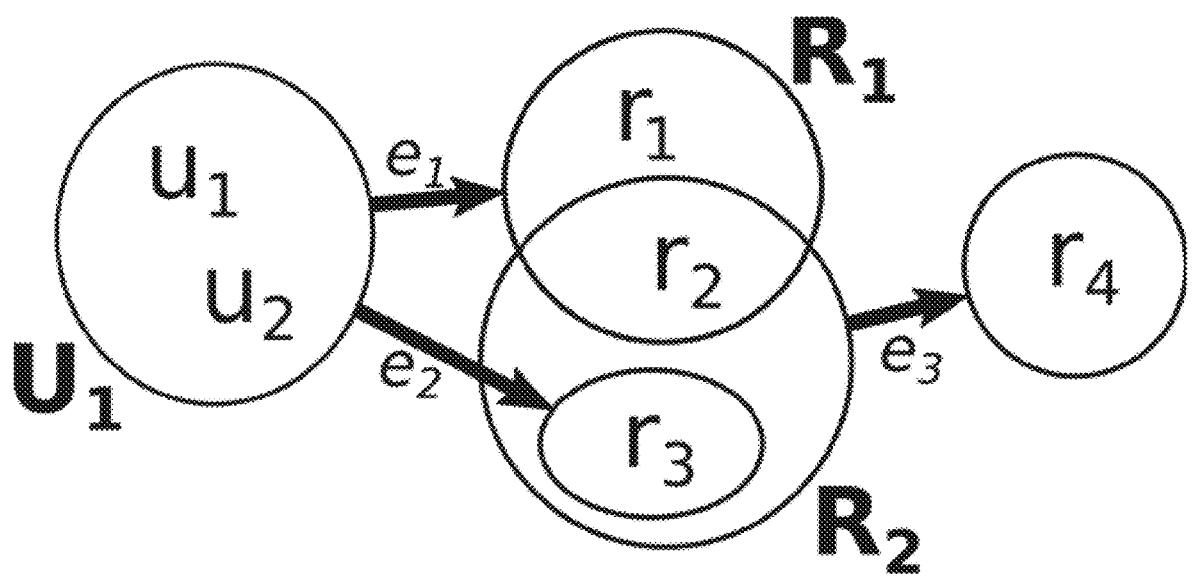
FIG. 7 shows a meta-graph consisting of six variables, five sets, and three edges.
Figure 8:
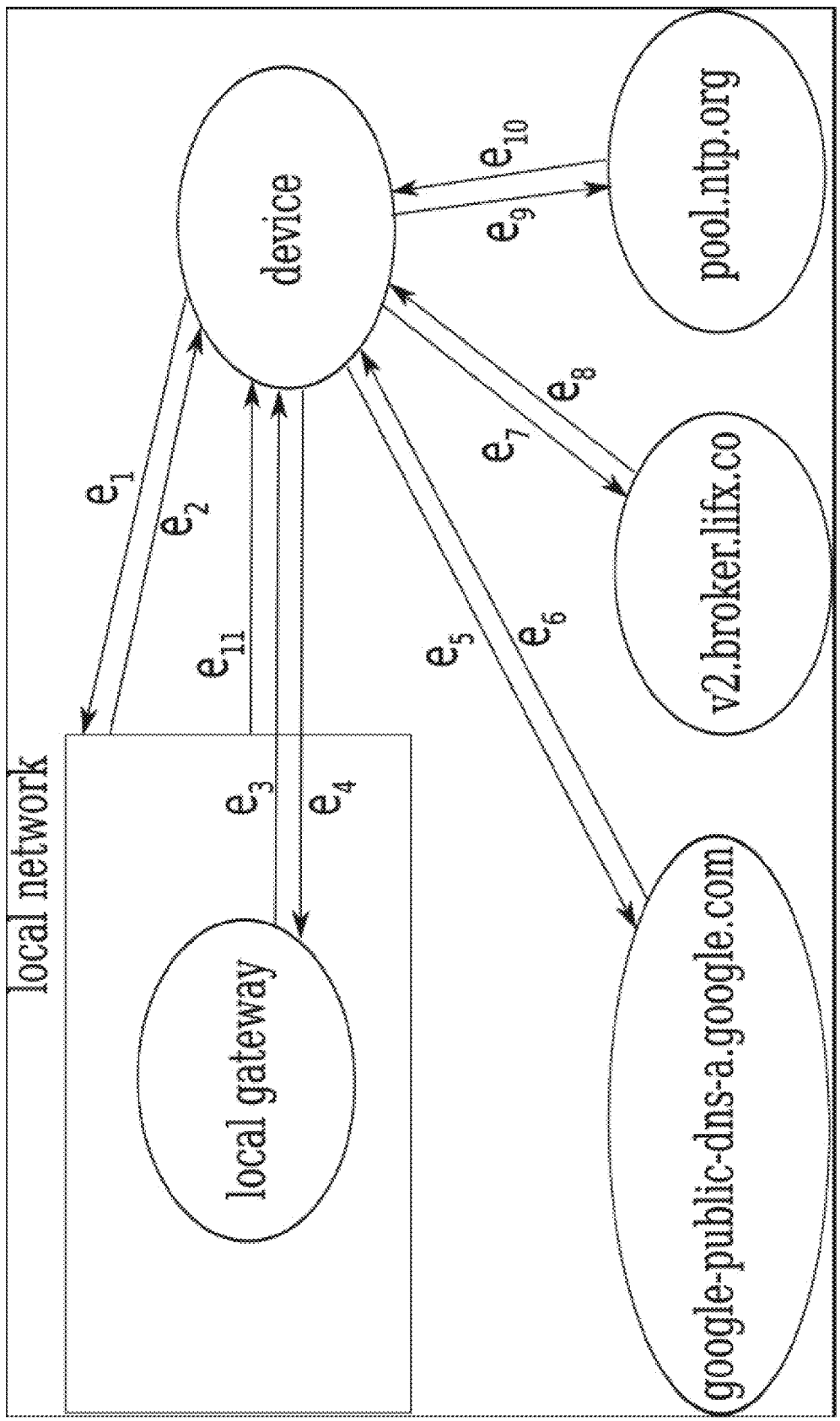
FIG. 8 is a meta-graph model of the MUD policy of a LiFX lightbulb IoT device, representing its permitted traffic flow behaviour.

FIGS. 5 and 6 are Sankey diagrams representing MUD profiles in a human-friendly way. The second category of generated MUD profiles is exemplified by FIG. 5. This Sankey diagram shows how the TP-Link camera accesses/exposes limited ports on the local network. The camera gets its DNS queries resolved, discovers local network using mDNS over UDP 5353, probes members of certain multicast groups using IGMP, and exposes two TCP ports 80 (management console) and 8080 (unicast video streaming) to local devices. All these activities can be defined by a tight set of ACLs.

But, over the Internet, the camera communicates with its STUN server, accessing an arbitrary range of IP addresses and port numbers shown by the second top flow. Due to this communication, the functionality of this device can only be loosely defined. Devices that fall in to this category (i.e., due to the use of STUN protocol), are marked in italics in Table 3.

The functionality of these devices can be more tightly defined if the manufacturers of these devices configure their STUN servers to operate on a specific set of endpoints and port numbers, instead of a broad and arbitrary range.

The Amazon Echo is an example of an IoT device with complex and dynamic functionality, augmentable using custom recipes or skills. Such devices (underlined in Table 3) can communicate with a growing range of endpoints on the Internet, which the original manufacturer cannot define in advance. For example, in the testbed the Amazon Echo interacts with the Hue lightbulb by communicating with meethue.com over TCP 443. It also contacts the news website abc.net.au when prompted by a user.

For these types of devices, the biggest challenge is how manufacturers can dynamically update their MUD profiles to match the device capabilities. However, even the initial MUD profile itself can help establish a minimum network-communication permissions set that can be updated over time.

II—Checking Run-Time Profiles of IoT Devices

In a second aspect, the network behaviors of IoT devices are tracked at run-time, mapping the behaviour of each device to one of a set of known MUD profiles. This is needed for managing legacy IoTs that do not have support for the MUD standard. To do so, a behavioral profile is automatically generated and updated at run-time (in form of a tree) for an IoT device, and a quantitative measure of its "similarity" to each of the known static MUD profiles (e.g., provided by manufacturers) is calculated. It is noted that computing similarity between two such profiles is a non-trivial task.

Profile Structure

Figure 12:
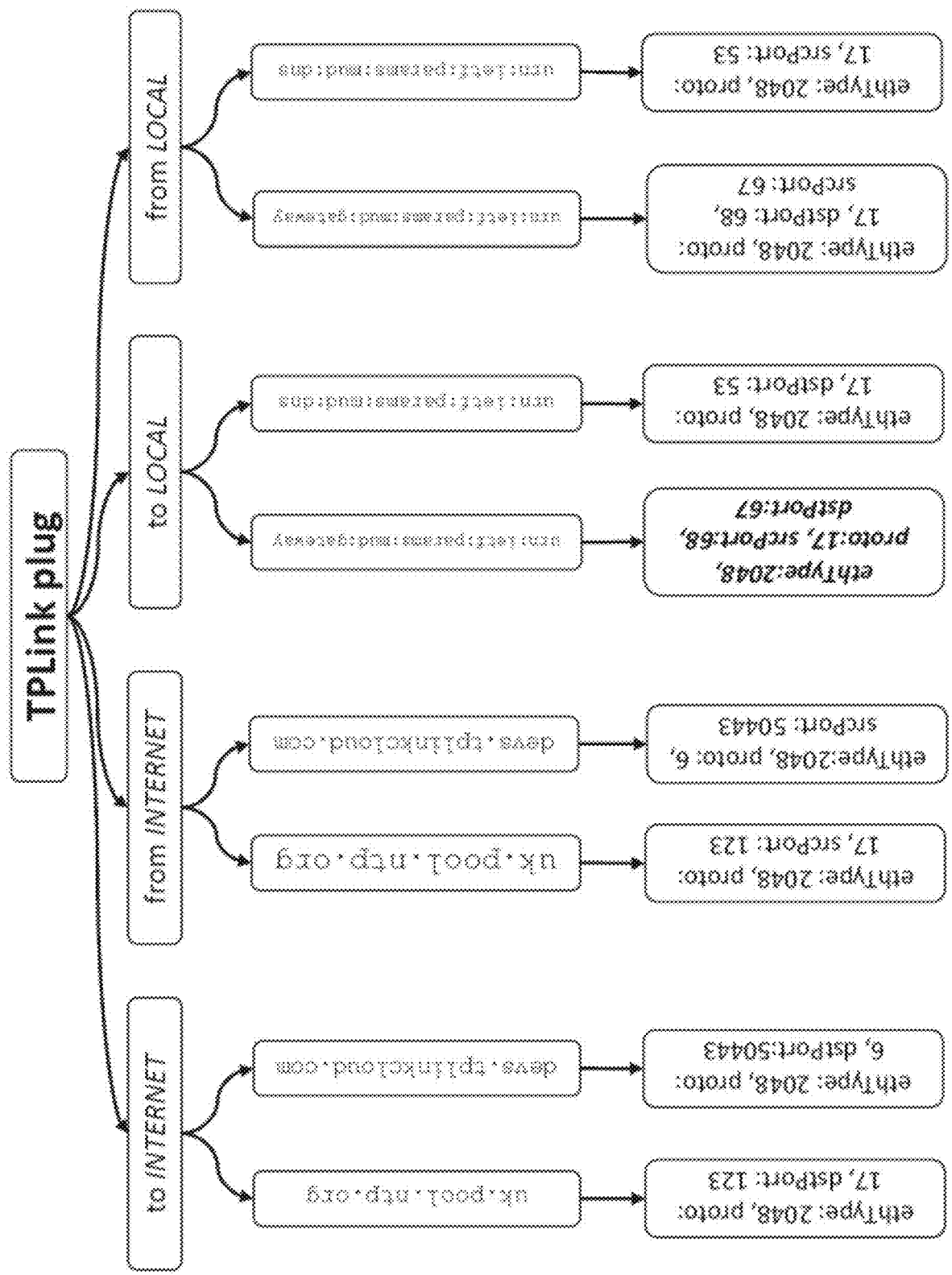
FIGS. 12 and 13 are schematic representations of runtime profiles of a TP-Link power plug IoT device generated from network traffic collected over periods of 30 and 480 minutes, respectively.
Figure 13:
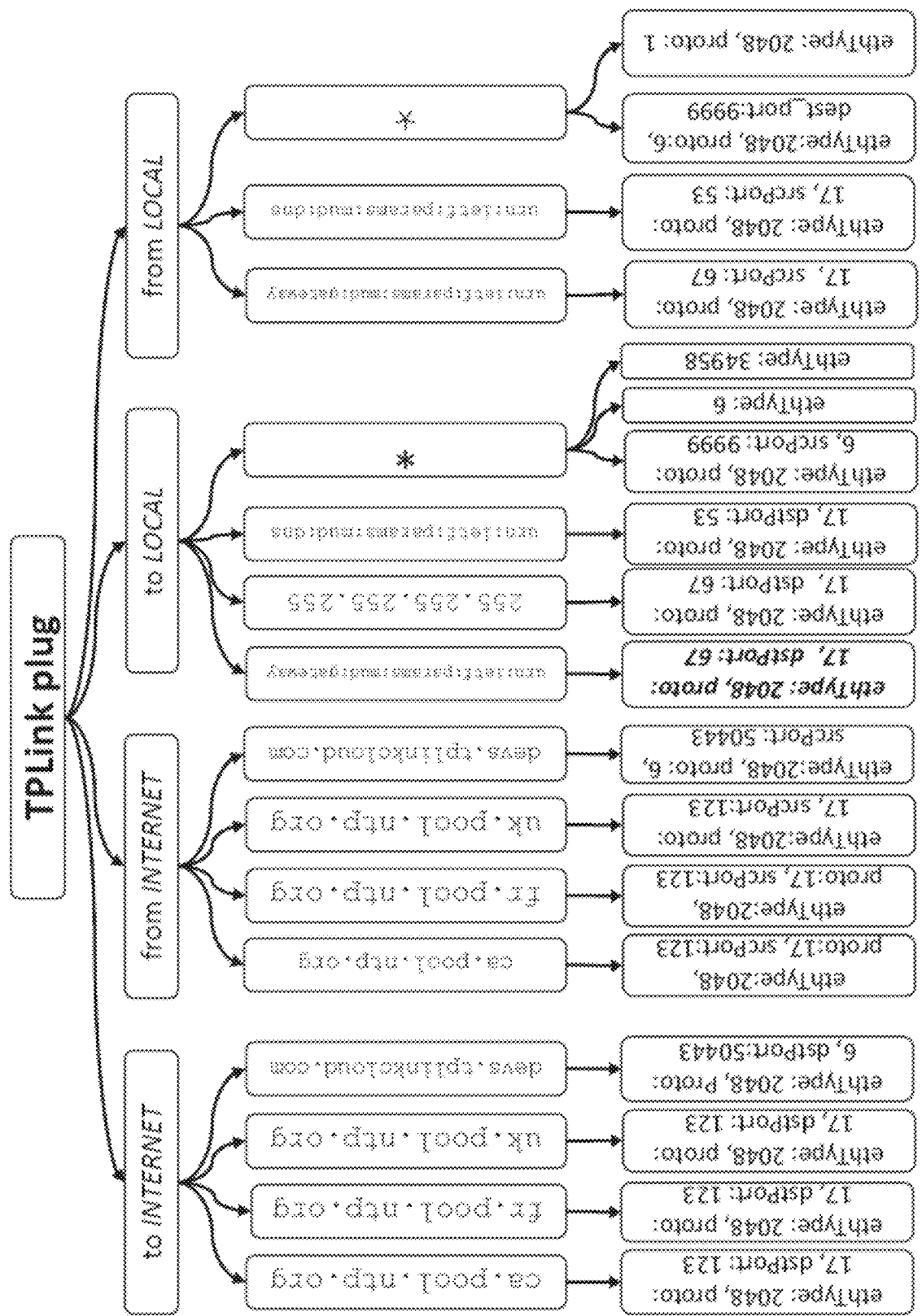

A device profile has two main components, namely "Internet" and "Local" communication channels, as shown by shaded areas in FIGS. 12 and 13. Each profile is organized into a tree-like structure containing a set of nodes with categorical attributes (i.e., end-point, protocol, port number over Internet/Local channels) connected through edges. Following the root node in each tree, there are nodes representing the channel/direction of communication, endpoints with which the device communicates, and the flow characteristics (i.e., the leaf node). The run-time profile of a device (given a set of known MUD profiles) is generated using a method similar to that described above, with minor modifications, as described below.

Figure 9:
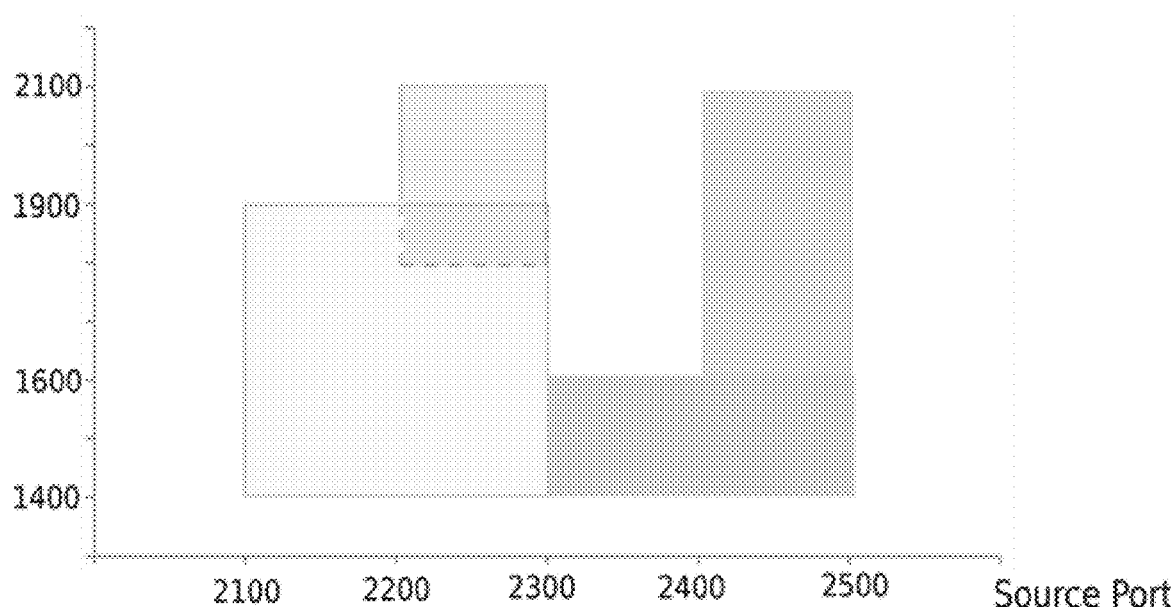
FIGS. 9 to 11 are graphical representations of respective different rule sets defining the same MUD policy, where each rectangular region represents the network packets allowed by a corresponding rule.
Figure 10:
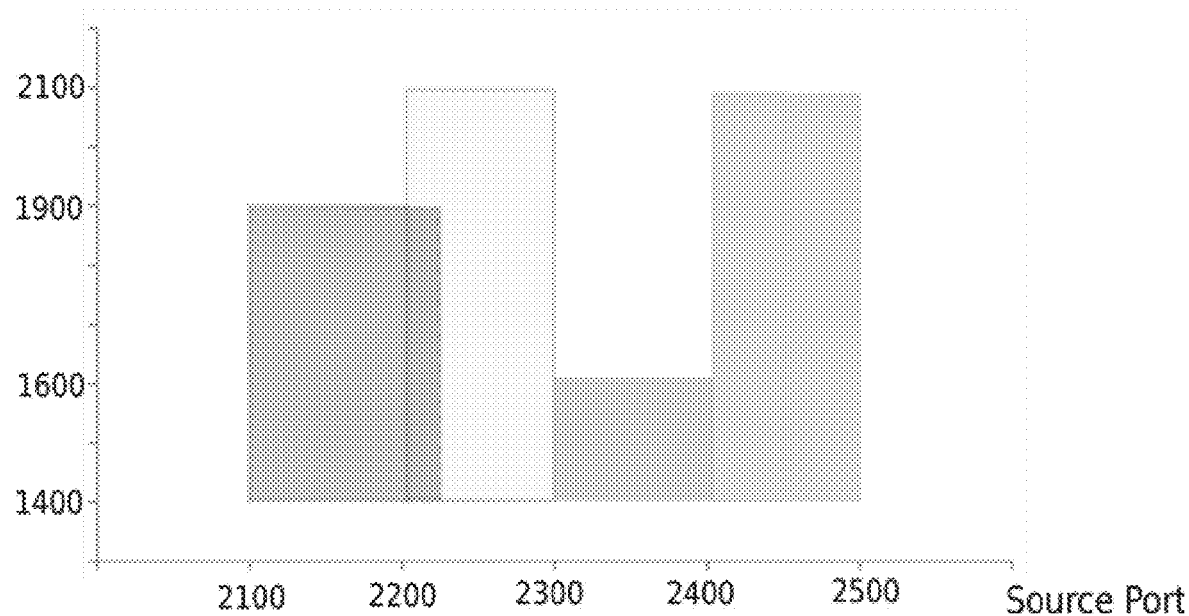
Figure 11:
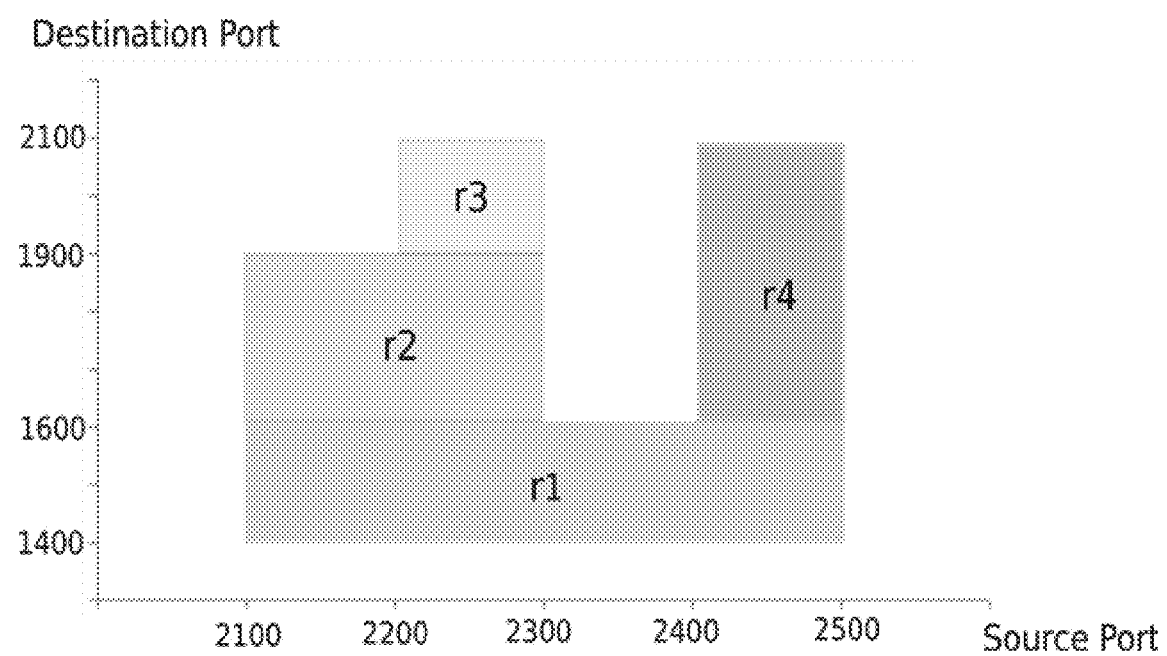

The MUDgee tool tracks the traffic volume exchanged in each direction of UDP flows distinguishing the server and the client. However, this would lead to a high consumption of memory for generating run-time profiles. Therefore, given a UDP flow all known MUD profiles are searched for an overlapping region on either the IoT side or the remote side (similar to the concept illustrated in FIGS. 9 to 11. If an overlapping region is found, then the tree structure is updated with intersecting port ranges—this can be seen in FIGS. 12 and 13 where the leaf node shown in bold-and-italic text has been changed according to known MUD profiles. If no overlap is found with the MUD profiles, then the UDP flow is split into two leaf nodes: two flows matching the UDP source port (with a wild-carded destination) and the UDP destination port (with a wild-carded source) separately. This helps to identify the server side by a subsequent packet matching either of these two flows.

This ensures that the tree structure becomes bounded. In addition, there is an upper bound for the maximum number of nodes that can be in any branch of the tree, and this is used to protect the tree from being unbounded during attacks.

The runtime profile of a device is generated through packet inspection. Initially, the DNS packet is monitored to identify the corresponding DNS bindings. Then, the first packet of a flow in a specific direction is inspected. If the inspected packet is from a TCP flow and also contains either a SYN or a SYN-ACK field, then a leaf node is inserted with entries for ethType, proto and the server side port identified through the TCP flags, whereas for UDP packets all 4 entries are added to the leaf node.

Meanwhile, as the tree structure is being generated, its growth is also iteratively (every 15 mins in the described embodiment) limited by 'compacting' (i.e., combining) its branches, based on the intersections between the run-time profile and all known MUD profiles.

Metrics

Figure 14:
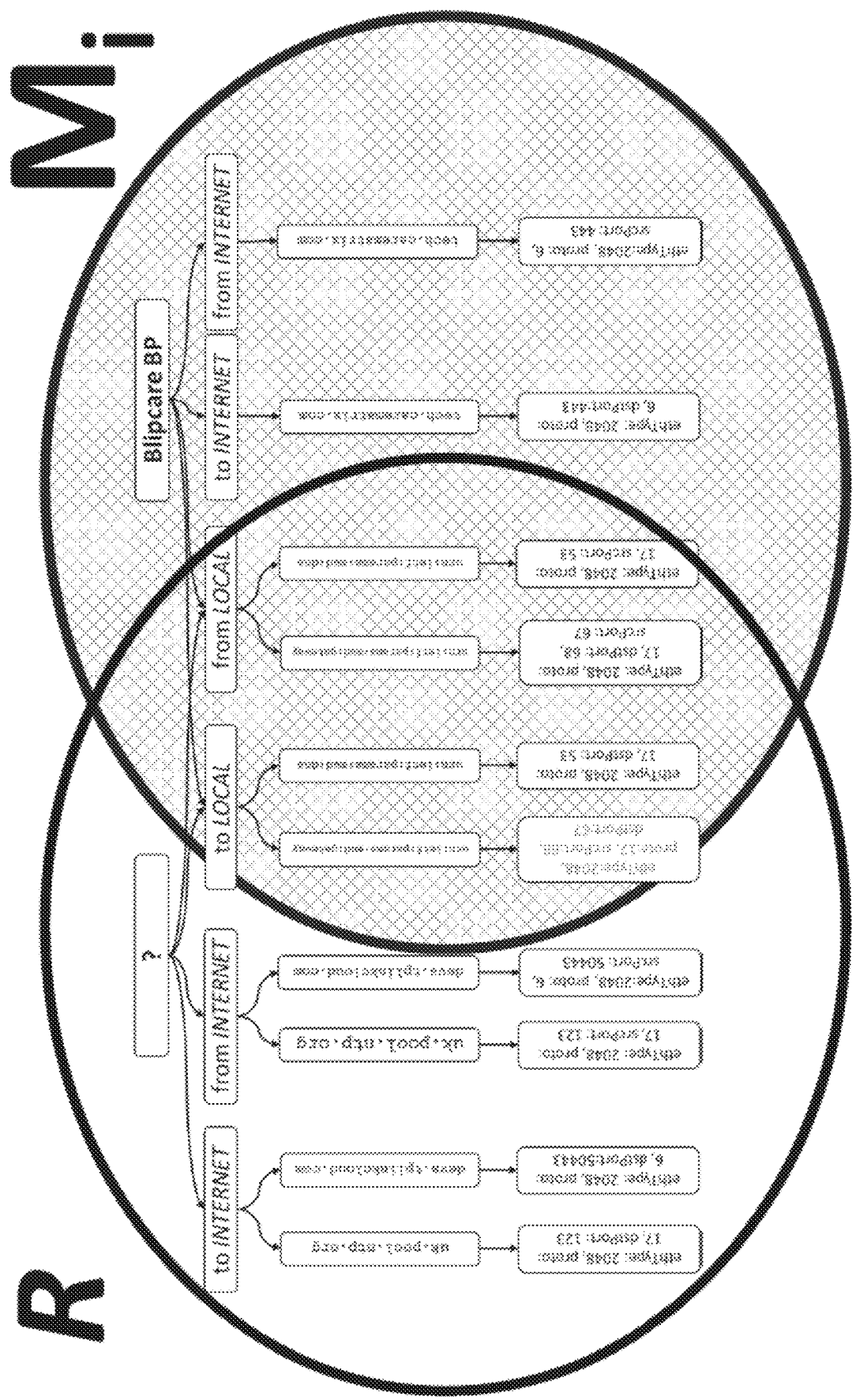
FIG. 14 is a schematic diagram illustrating a comparison of a run-time profile against known MUD profiles.

The run-time and MUD profiles are denoted respectively by sets R and $M_i$, as shown in FIG. 14. Each element of these two sets is represented by a branch of the tree structure shown in FIGS. 12 and 13. For a given IoT device, the similarity of its R with a number of known $M_i$'s is calculated.

There are a number of metrics for measuring the similarity of two sets. For example, the Jaccard index has been used for comparing two sets of categorical values, and is defined by the ratio of the size of the intersection of two sets to the size of their union, i.e., $|R \cap M_i|/|R \cup M_i|$ Inspired by the Jaccard index, in the described apparatus and process, the following two metrics are calculated:

$$\text{Dynamic similarity score: } sim_d(R, M_i) = \frac{|R \cap M_i|}{|R|}$$

$$\text{Static similarity score: } sim_s(R, M_i) = \frac{|R \cap M_i|}{|M_i|}$$

These two metrics collectively represent the Jaccard index. Each of these metrics would take a value between 0 (i.e., dissimilar) and 1 (i.e., identical). Similarity scores are computed every epoch time (e.g., 15 minutes). When computing $|R \cap M_i|$, redundant branches of the run-time profile are temporarily removed based on the MUD profile that it is being checked against. This assures that duplicate elements are pruned from R when checking against each $M_i$.

When calculating $|R \cap M_i|$, both R and Mi may be redundant to avoid duplicates in a set. Removing redundant nodes from Mi is straightforward—the redundancies can be removed from the tree structure by not having any leaf nodes inclusive to nodes from the same endpoint or with the wild card endpoint from the same direction. R's redundant structure depends on Mi. For example, if R contains communication to ports 8000 and 8002 of Internet server "abc.com", and If $M_1$ contains a rule of port number ranging from 8000 to 10000 with wild-carded endpoint (i.e., 1, then both flows from R can be captured by a single rule. Now assume another MUD profile, say $M_2$, contains the two rules of R, then this does not contain any redundancies. Therefore before calculating similarities, it is important to remove the redundancies based on the structure of $M_i$'s. This is denoted as $R_{M_i}$.

The run-time profile grows over time by accumulating nodes (and edges), as shown in FIGS. 12 and 13, for example. It is seen in FIG. 12 that the run-time profile of a TP-Link power plug consists of 8 elements (i.e., edges), 30 minutes after commencement of this profile generation. As shown in FIG. 13, the element count of the profile reaches 15 when more traffic an additional 450 minutes) of the device is considered.

At the end of each epoch, a device (or a group of devices) will be chosen as the "winner" that has the maximum similarity score with the IoT device whose run-time profile is being checked. It is expected to have a group of winner devices when the dynamic similarity is considered, especially when only a small subset of device behavioural profile is observed—the number of winners will reduce as the run-time profile grows over time.

Figure 15:
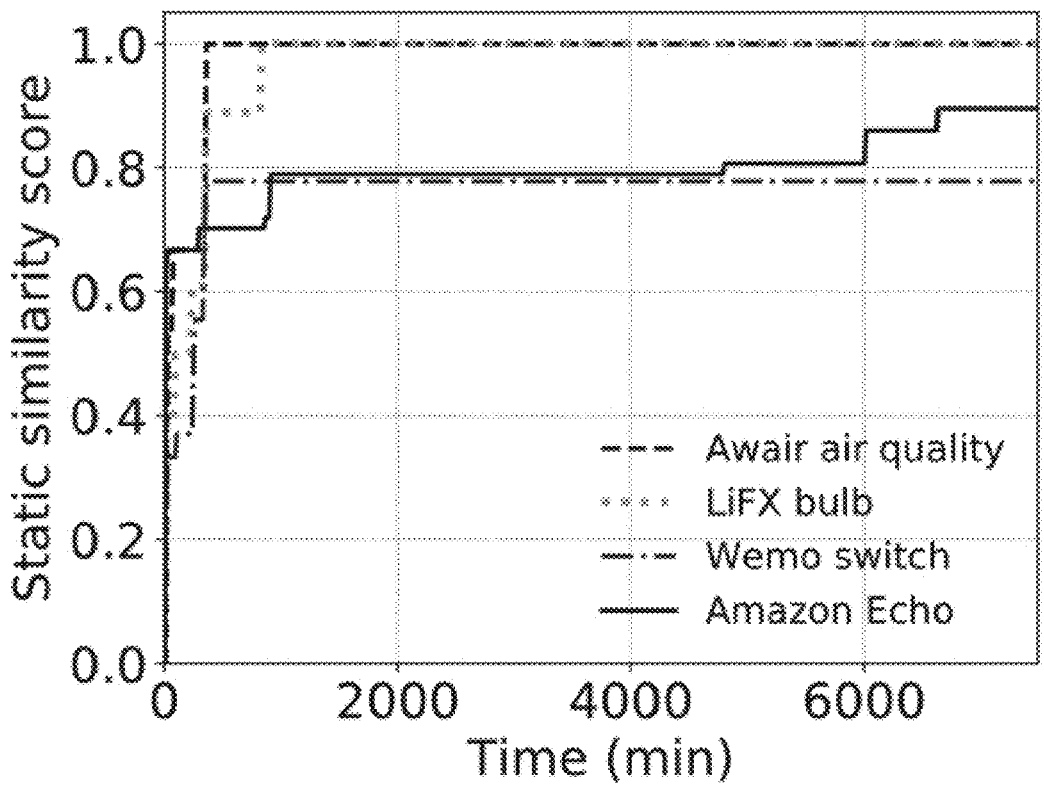
FIGS. 15 to 17 are graphs of static and dynamic similarity scores generated for four different IoT devices as a function of time during collection and analysis of network traffic flows.
Figure 16:
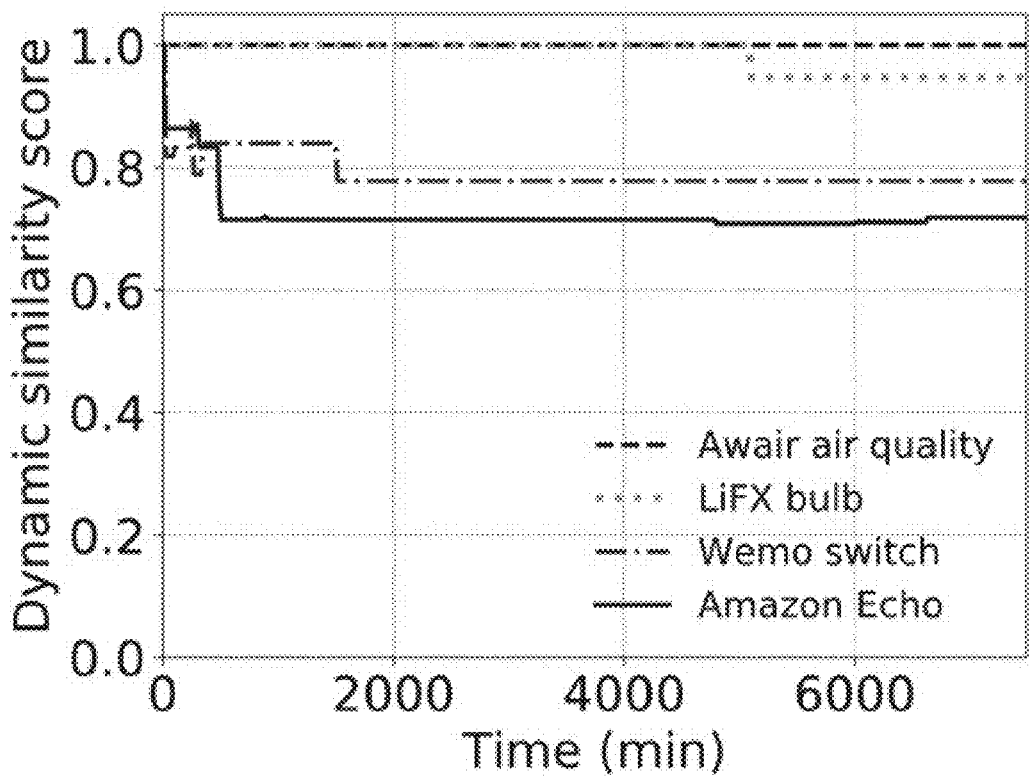
Figure 17:
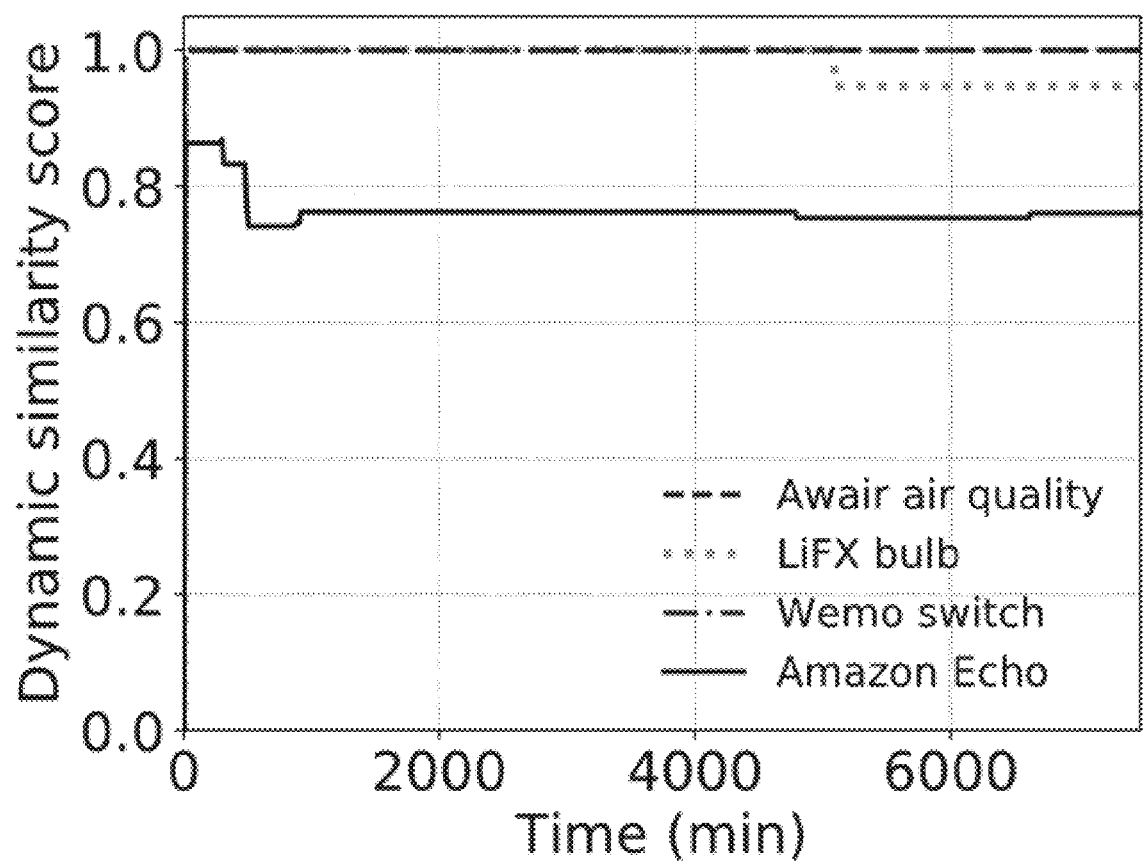
Figure 18:
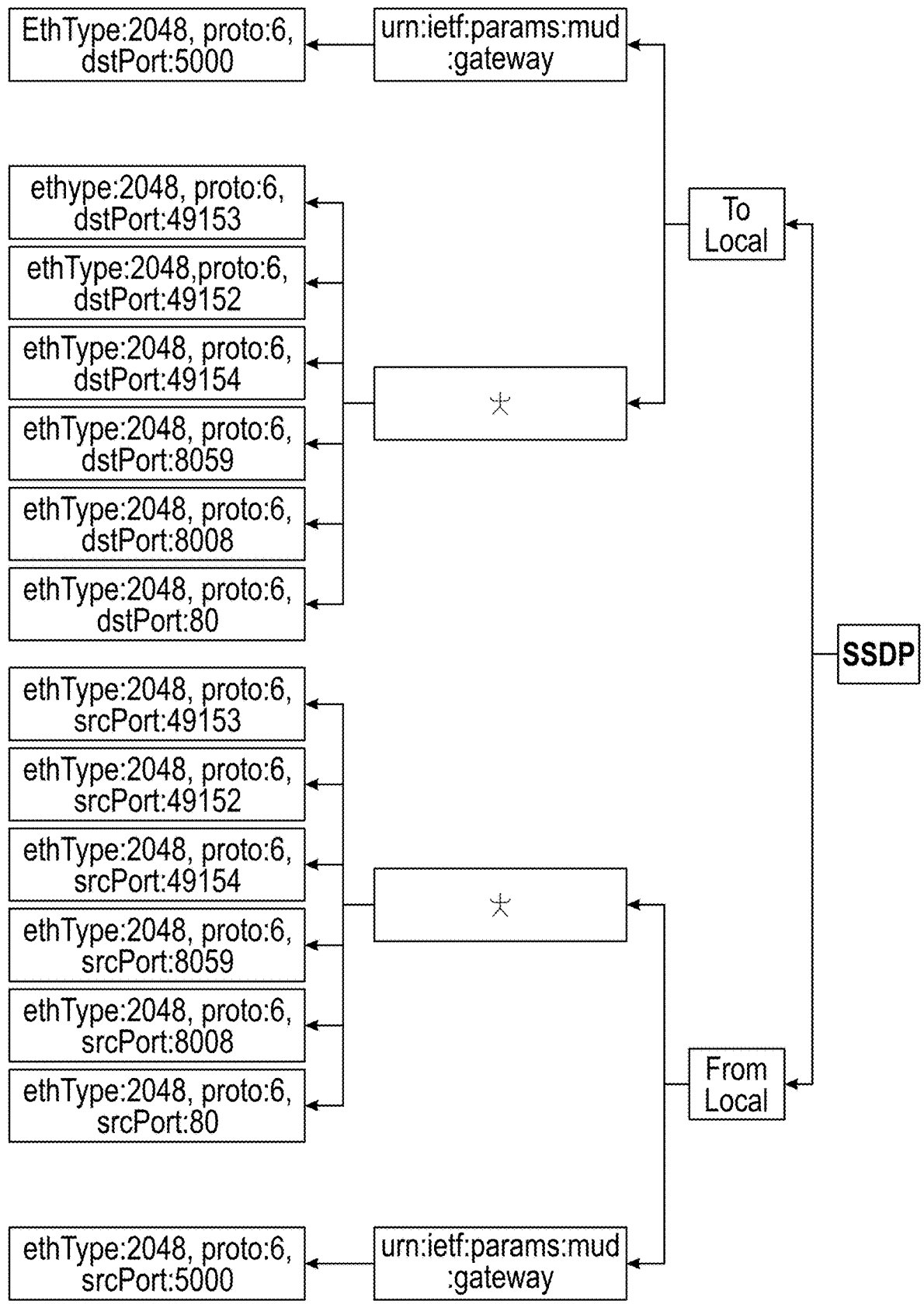
FIG. 18 is a schematic representation of an SSDP run-time profile across all devices on a network.

FIGS. 15 to 17 are graphs of the winner similarity scores as a function of time for selected IoT devices, including the Awair air quality sensor, the LiFX bulb, the WeMo switch, and the Amazon Echo. In these plots, the winner is correctly identified for all of these four IoTs. FIG. 15 shows that the static similarity score grows slowly over time, and in a non-decreasing fashion. The convergence time depends on the complexity of the device behavioural profile. For example, the static similarity of the Awair air quality and LiFX bulb devices converges to 1 (i.e., full score) within 1000 minutes. But for the Amazon Echo, it takes more time to gradually discover all flows, ultimately converging to the full score in about 12 days.

Also, there are IoT devices for which the static similarity might never converge to 1. For example, the WeMo switch and WeMo motion devices use a list of hard-coded IP addresses (instead of domain names) for their NTP communications. These IP addresses, however, do not serve the NTP service anymore, and consequently no NTP reply flow is captured. Similarly, it was observed that the TPLink plug uses the "s1b.time.edu.cn" address for NTP communications, and this domain name also seems to be not operational anymore. In addition, devices such as the August doorbell and Dropcam contact public DNS resolvers (e.g., 8.8.4.4) if the local gateway fails to respond to a DNS query of the IoT device, meaning that this specific flow will only be captured if there is an Internet outage.

On the other hand, in FIG. 16 the dynamic similarity score grows quickly (it may even reach a value of 1, meaning $R \subset M_i$). It may stay at 1 if no variation is observed. The Awair air quality sensor is an example of such behaviour, as shown by dashed black lines in FIG. 16—19 out of 28 IoT devices in the testbed were found to behave similarly to the Awair air quality sensor in their dynamic similarity score. In some other cases, this score may slightly fall and rise again. Note that a fluctuating dynamic similarity never meets 1 due to missing elements (i.e., variations). Missing elements can arise for various reasons, including: (a) MUD profile is unknown or not well-defined by the manufacturer, (b) the device firmware is old and not up-to-date, and (c) the IoT device is compromised or under attack.

During testing, the inventors found that 9 of their lab IoTs had slight variations for two reasons: firstly, responding to discovery requests in Local communications, if they support SSDP protocol—these responses cannot be tightly specified by the manufacturer in the MUD profile since such flows depend on the environment in which the IoT device is deployed. The WeMo switch is an example of this group, as shown by dashed-dotted lines in FIG. 16. To address this issue, all discovery communications were used to generate a separate profile (shown in FIG. 18) by inspecting SSDP packets exchanged over the Local network. The SSDP server port number on the device can change dynamically, thus the inspection of the first packet in a new SSDP flow is required. The second reason is that missing DNS packets leads to the emergence of a branch in the profile with an IP address as the end-point instead of a domain name. This rarely occurs in the testbed network, because every midnight the process starts storing traffic traces into a new PCAP file, and thus a few packets can be lost during this transition to a new PCAP file. Missing a DNS packet was observed for the LiFX bulb, as shown by dotted lines in FIG. 16.

In view of the above, SSDP activity is excluded from local communications of IoT devices to obtain a clear run-time profile. As shown in FIG. 17, without SSDP activity, the dynamic similarity score is able to correctly identify the correct winner for the WeMo switch within a very short time interval.

Lastly, it is important to note that similarity scores (both static and dynamic) can be computed at an aggregate level (i.e., Local and Internet combined), or for individual channels, meaning one score for the Local and one for the Internet channel. The two scores might not converge in some cases where the Local channel similarity chooses a winner while the Internet channel similarity finds a different winner device. Per-channel similarity never results in a wrong winner, though it may result in no winner. However, the aggregate similarity may end up identifying an incorrect winner, especially when the Local activity becomes dominant in the behavioural profile. This is because many IoTs have a significant profile overlap in their Local communications (e.g., DHCP, ARP, or SSDP). Therefore, the per-channel similarity is checked first. If the two channels disagree, the process switches to aggregate similarity to identify the winner.

Identifying IoT Devices at Run-Time

Packet traces (i.e., PCAP files) were collected from the inventors' testbed network, including a gateway (a TP-Link Archer C7 flashed with OpenWrt firmware) that serves a number of IoT devices. The tcpdump tool was used to capture and store all network traffic (Local and Internet) on USB storage connected to the gateway. The resulting traffic traces span three months starting from May 2018, containing traffic corresponding to the IoT devices listed in Table 3 (excluding the Withings baby monitor). The MUDgee tool was used to generate MUD profiles for the IoT devices in the testbed.

As explained above, the dynamic similarity score converges faster than the static similarity score. The device identification process begins by tracking dynamic similarity at the channel level, and continues as long as the channels still agree (i.e., they both choose the same winner). Depending on the diversity of observed traffic to/from the IoT device (Local versus Internet), there can be multiple winners at the beginning of the process. In this case, the static similarity is fairly low, since a small fraction of the expected profile is likely to be captured in a short time interval. This means that the process needs to see additional traffic from the device before it concludes.

Figure 19:
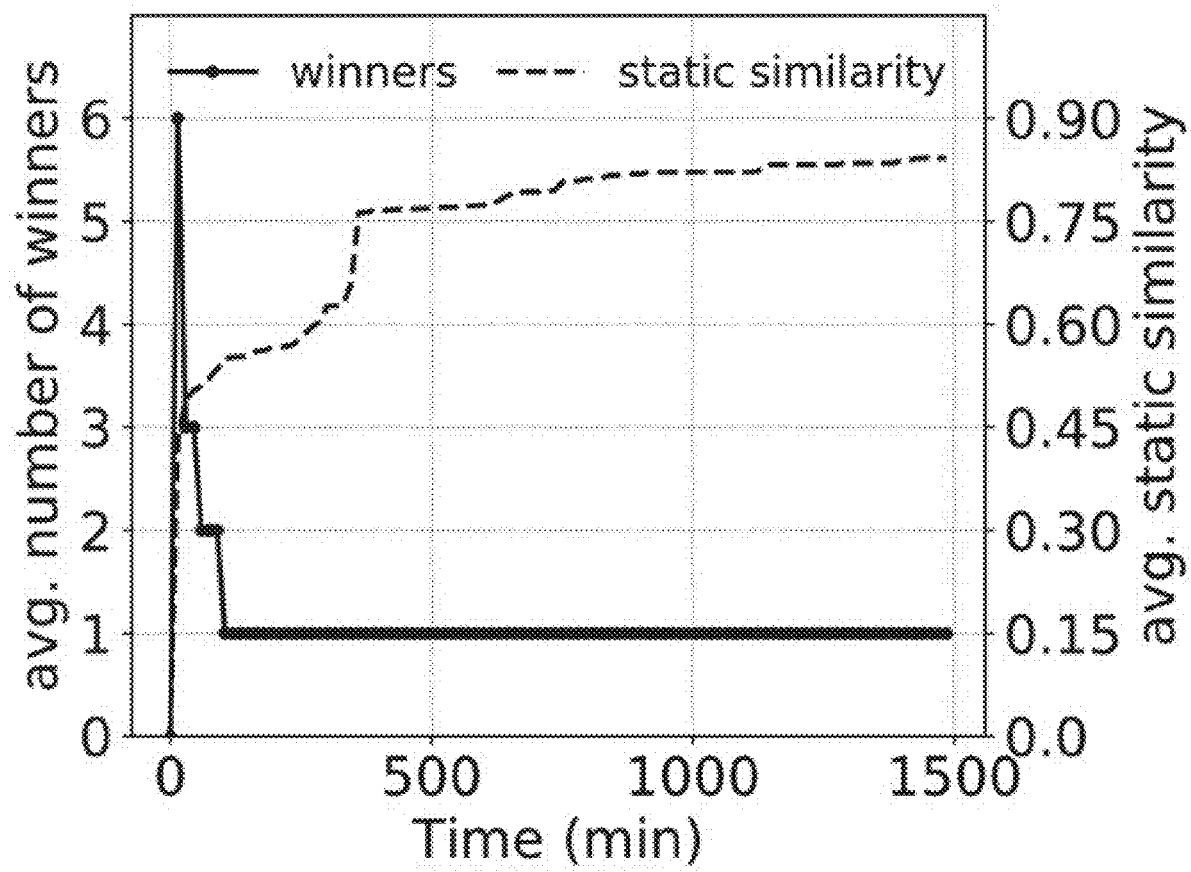
FIG. 19 is a graph of the average number of winners and the average static similarity score as a function of time during collection and analysis of network traffic flows.

FIG. 19 shows the time evolution of the winners count and static similarity, averaged across all 27 IoT devices in the testbed. Focusing on the solid blue line (left y-axis), there were up to 6 winners on average at the beginning of the identification process. The winners count gradually comes down (in less than three hours) to a single winner, and stabilizes.

Even with a single winner, the static similarity, shown by dashed black lines (right y-axis), needs about ten hours on average to exceed a score of 0.8. Note that the similarity may take a very long time to reach the full score of 1 (sometimes, it may never reach the full score as explained above). It is up to the operator to choose an appropriate threshold at which this process concludes—a higher threshold increases the confidence level of the device identification, but it comes at the cost of longer convergence time.

Thus the dynamic similarity (starting with channel level similarity, and possibly switching to aggregate level) is used to identify the winner IoT at run-time. The static similarity, on the other hand, is used to track the confidence level—an indication of safe convergence if the dynamic similarity of full score is not reached.

Figure 20:
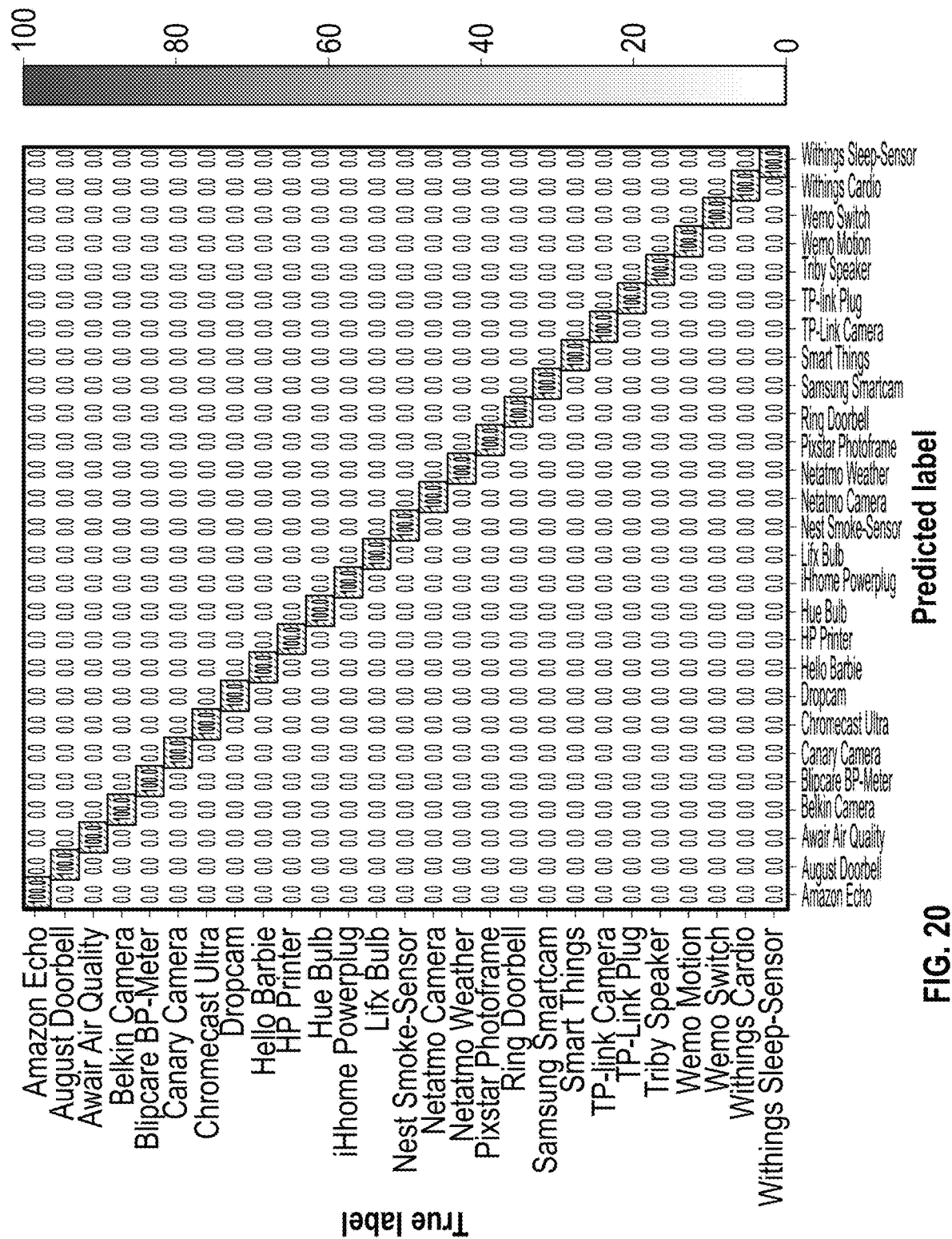
FIG. 20 is a confusion matrix showing the relationship between predicted and true labels of 28 different IoT devices.

To evaluate the efficacy of IoT device identification at run-time, the traces collected in 2018 (i.e., data 2018) were replayed into the packet simulator tool. FIG. 20 is a confusion matrix of the results, where the rows are true labels, the columns are the predicted labels, and the cell values are percentages. For example, the first row shows that the Amazon Echo is always predicted as the sole winner in each and every epoch of the identification process, thus 100% in the first column and 0% in the remaining columns—no other device is identified as the winner in any single epoch time.

Looking at the Dropcam row, it is identified as multiple devices (i.e., more than one winner) for some epochs—non-zero values are seen against all columns. But, it is important to note that Dropcam is always one of the winners, thus 100% against the Dropcam column. Further, it is also identified for example as the Amazon Echo in 0.4% of epochs.

A 100% correct convergence was observed for all devices except for the Netatmo camera, whereby it is not correctly identified in 2.3% of epochs. This mis-identification occurs due to missing DNS packets where some flows were incorrectly matched on STUN related flows (with wild-carded endpoints) of the Samsung camera and the TP-Link camera. However, this mis-identification occurred only during the first few epochs and then it converged to the correct winner.

Monitoring Behavioral Change of IoTs

In a real environment, there are several challenges to correctly identify an IoT device at run-time: (a) there might be a device on the network for which no MUD profile is known, (b) the device firmware might not be up-to-date (thus, the run-time profile would deviate from its intended known MUD profile), and/or (c) the device might be under attack or even fully compromised. Each of these three challenges and their impact on the similarity score (both dynamic and static) are discussed below.

Figure 21:
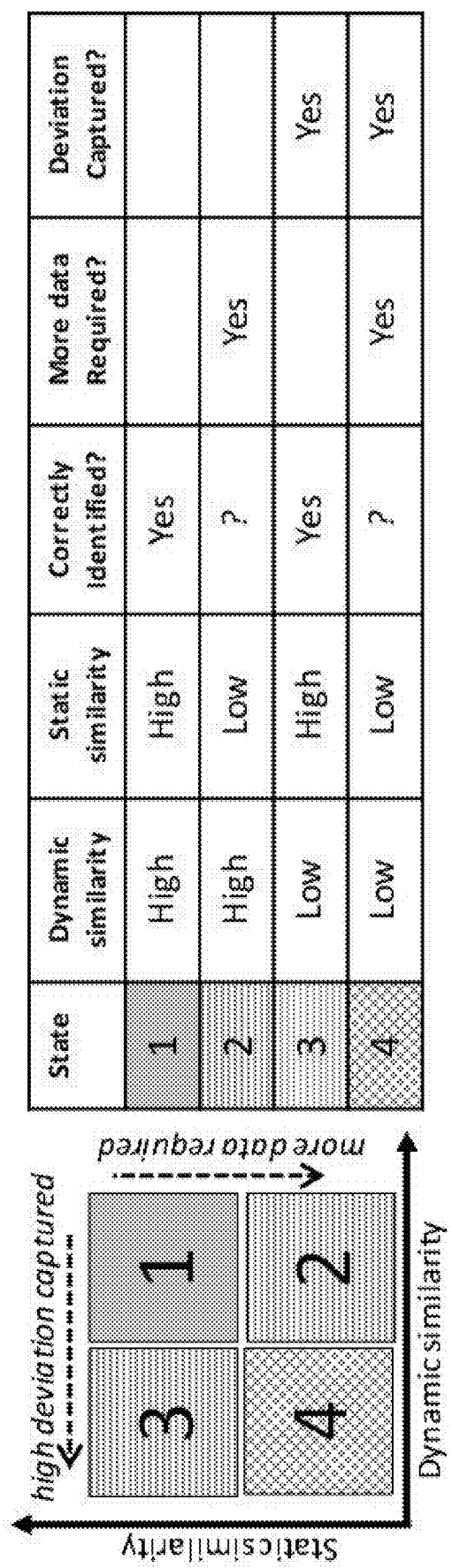
FIG. 21 is a schematic representation of dynamic similarity versus static similarity.

FIG. 21 depicts a simplified scatter plot of dynamic similarity versus static similarity, highlighting how these two metrics are interpreted. On the plot, states are labelled as 1, 2, 3, and 4. The ideal region is the quadrant highlighted for state-1 whereby both dynamic and static scores are high, and there is a single and correctly identified winner. Considering state-2 in this figure, there is a high score of dynamic similarity, whereas the static similarity is fairly low. This score combination is typically expected when a small amount of traffic from the device is observed, and more traffic is needed to determine whether the dynamic similarity continues to maintain a high score and the static similarity possibly starts rising. In state-3, having a low dynamic similarity is alarming, given the high score in the static similarity—indicating high variations at run-time. This score combination is observed when many flows observed in the device traffic are not listed in the intended MUD profile for two possible reasons: (a) the device firmware is not current, or (b) the device is under attack (or even compromised). Lastly, having low scores in both dynamic and static similarity metrics highlights a significant difference (or small overlap) between the run-time and MUD profiles. This scenario likely results in identification of an incorrect winner.

To summarize, IoT network operators may need to set threshold values for both dynamic and static similarity scores to select the winner device. Also, the identification process needs to begin with the channel-level similarity (for both dynamic and static metrics) avoiding a biased interpretation, and may switch to aggregate-level in the absence of convergence. The impact of three scenarios impacting the IoT behavioral changes is described below.

Unknown MUD Profile

To investigate this scenario, the MUD profile of each device was removed from the list of known MUDs. FIG. 22 shows the partial results for selected devices. Unsurprisingly, devices on the rows are identified as others (i.e., one or multiple wrong winners selected), since their intended MUD profile is not present when checked at run-time. For example, the Amazon Echo converges to identification as a TP-Link camera, and the Awair air quality sensor is consistently identified as six other IoT devices. Ideally, there should not be any one device identified as the winner. Note that these results are obtained while no thresholding is applied to the similarity scores, and only the maximum score indicates the winner.

Figure 23:
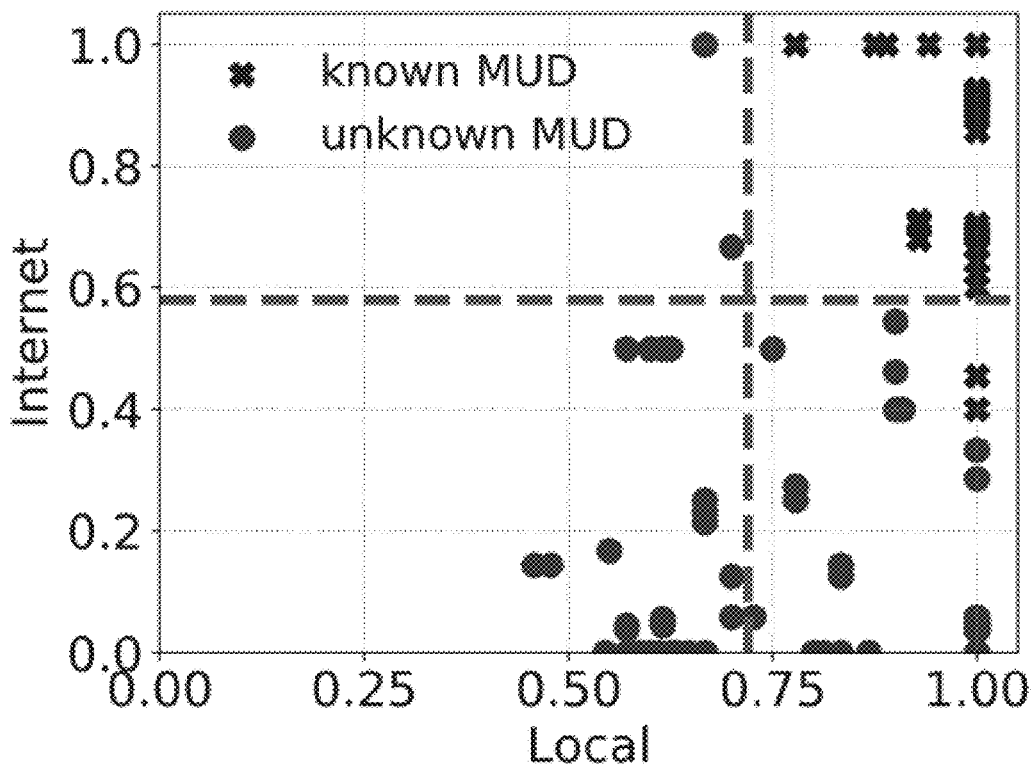
FIGS. 23 and 24 are graphs showing the relationship between Internet similarity scores and dynamic (FIG. 23) or static (FIG. 24) local similarity scores.
Figure 24:
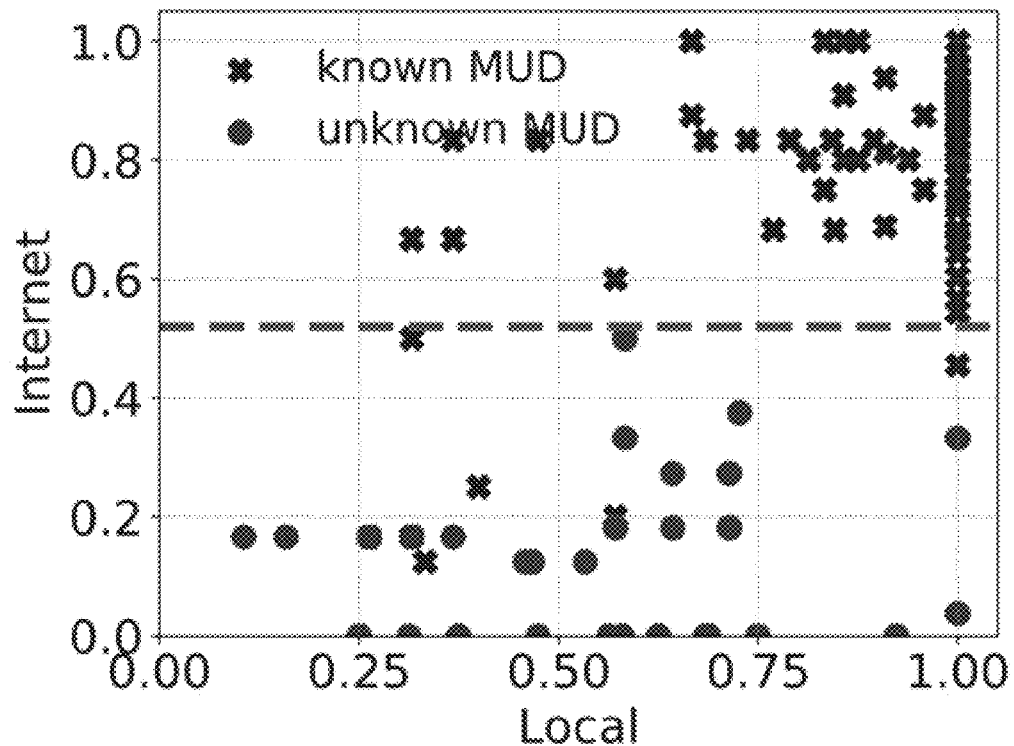

FIGS. 23 and 24 are scatter plots of channel-level scores for dynamic and static similarity metrics, respectively. The 2018 dataset was used to generate two sets of results: one with MUD profiles of the devices (shown by blue cross markers), and the other without their MUD profiles (shown by red circle markers), across all 27 IoT devices. For the dynamic similarity in FIG. 23, having two thresholds (i.e., about 0.60 on the Internet channel and 0.75 on the Local channel) would filter incorrect instances. For the static similarity in FIG. 24, a threshold of 0.50 on the Internet channel is sufficient to avoid incorrect identifications. This single threshold is because the IoT profile on the Internet channel varies significantly for consumer devices (in the test bed setup), but enterprise IoTs may tend to be active on the Local network—thus a different thresholding is generally required for each network.

It is important to note that a high threshold would increase the identification time, and a low threshold accelerates the process but may lead to identification of a wrong winner. It is therefore up to the network operator to set appropriate threshold values. One conservative approach would be to accept no variation in the dynamic similarity, requiring a full score of 1 along with a static similarity score of more than 0.50 for each of the Local and Internet channels. For example, the results were regenerated by setting conservative thresholds mentioned above, and thus no winner was identified due to low scores in both dynamic and static similarity metrics, as shown by the state-4 quadrant in FIG. 21. This indicates that IoT devices, in absence of their MUD profiles, are consistently found in state-4, flagging possible issues.

Old Firmware

IoT devices either upgrade their firmware automatically by directly communicating with a cloud server, or may require the user to confirm the upgrade (e.g., the WeMo switch) via an App. For the latter, devices will remain behind the latest firmware until the user manually updates them. To illustrate the impact of old firmware, packet traces collected from the testbed over a duration of six months starting in October 2016 were used to generate run-time profiles against MUD profiles generated from data 2018. Table 4 below shows the results from data 2016.

The column labeled "Profile changed" indicates whether any changes on device behaviour were observed (i.e., verified manually) from the data 2016 dataset, compared to data 2018. These behavioural changes include endpoints and/or port number. For example, the TP-Link camera communicates with a server endpoint "devs.tplinkcloud.com" on TCP 50443 according to the data 2016. However, this camera communicates with the same endpoint on TCP 443 in the data 2018. Additionally, in the data 2018 dataset, an endpoint "ipcserv.tplinkcloud.com" is observed, which did not exist in the data 2016.

As discussed above, a threshold is required to improve the identification process, discovering unknown devices or problematic states. Therefore, thresholds determined using the data 2018 were applied and the results are shown in the column labeled as "Convergence with threshold" in Table 4. Devices that did not have behavioural changes (from 2016 to 2018), converge correctly and appear in perfect state-1. Looking into other devices, for example the Amazon Echo, only 65.7% of instances are correctly identified—it took a while for the identification process to meet the expected thresholds set for similarity scores.

TABLE 4 run-time identification results using the "data 2016" dataset as described above.

| | | Convergence | | | Convergence with threshold | | | Endpoint compacted | | |
|---|---|---|---|---|---|---|---|---|---|---|
| | | Known MUO | | Unknown MUD | Known MUD | | Unknown MUD | Known MUD | | Unknown MUD |
| IoT device | Profile change | Correctly identified (%) | Incorrectly identified (%) | Incorrectly identified (%) | Correctly identified (%) | Incorrectly identified (%) | State | Incorrectly identified (%) | Correctly identified (%) | Incorrectly identified (%) | Incorrectly identified (%) |
| Amazon Echo | Yes | 100 | 0 | 100 | 65.7 | 0 | 3 | 0 | 65.7 | 0 | 9 |
| August doorbell | Yes | 100 | 0 | 100 | 0 | 0 | 4 | 0 | 100 | 0 | 0 |
| Awair air quality | Yes | 100 | 0 | 100 | 100 | 0 | 1 | 0 | 100 | 0 | 0 |
| Belkin camera | Yes | 100 | 0 | 100 | 100 | 0 | 1 | 0 | 100 | 0 | 0 |
| Blipcare BP meter | No | 100 | 0 | 100 | 100 | 0 | 1 | 0 | 100 | 0 | 0 |
| Canary camera | No | 100 | 0 | 100 | 100 | 0 | 1 | 0 | 100 | 0 | 0 |
| Dropcam | Yes | 100 | 0 | 100 | 95.9 | 0 | 3 | 0 | 100 | 0 | 0 |
| Hello barbie | No | 100 | 0 | 100 | 100 | 0 | 3 | 0 | 100 | 0 | 0 |
| Hp printer | Yes | 100 | 0 | 100 | 3.6 | 0 | 4 | 0 | 99.8 | 0 | 0 |
| Hue bulb | Yes | 100 | 0 | 100 | 0 | 0 | 4 | 0 | 90.6 | 0 | 0 |
| iHome power plug | Yes | 100 | 0 | 100 | 0.5 | 0 | 4 | 0 | 100 | 0 | 0 |
| LiFX bulb | No | 100 | 0 | 100 | 100 | 0 | 1 | 5.3 | 100 | 0 | 5.3 |
| Nest smoke sensor | Yes | 100 | 0 | 100 | 0 | 0 | 4 | 0 | 100 | 0 | 0 |
| Netatmo camera | Yes | 99.4 | 0.6 | 100 | 97.3 | 0 | 3 | 0 | 99 | 0 | 0 |
| Netatmo weather | No | 100 | 0 | 100 | 100 | 0 | 1 | 0 | 100 | 0 | 0 |
| Pixstar photoframe | No | 100 | 0 | 100 | 100 | 0 | 1 | 0 | 100 | 0 | 0 |
| Ring doorbell | Yes | 100 | 0 | 100 | 99.6 | 0 | 3 | 0 | 97.9 | 0 | 0 |
| Samsung smartcam | Yes | 100 | 0 | 100 | 97.6 | 0 | 1 | 0 | 97.6 | 0 | 0 |
| Smart Things | No | 100 | 0 | 100 | 100 | 0 | 3 | 0 | 100 | 0 | 0 |
| TPlink camera | Yes | 100 | 0 | 100 | 100 | 0 | 1 | 0 | 100 | 0 | 0.9 |
| TPlink plug | Yes | 100 | 0 | 100 | 100 | 0 | 3 | 0 | 100 | 0 | 0 |
| Triby speaker | Yes | 100 | 0 | 100 | 39.9 | 0 | 3 | 0 | 99.8 | 0 | 0 |
| WeMo motion | No | 100 | 0 | 100 | 100 | 0 | 1 | 0.7 | 100 | 0 | 27.3 |
| WeMo switch | Yes | 0 | 100 | 100 | 0 | 100 | 1 | 100 | 0 | 100 | 100 |

The "Convergence" column in Table 4 shows the performance of the device identification process (converging to a single winner) without thresholding, for two scenarios, namely known MUD (i.e., the MUD profile of the device is present) and unknown MUD (i.e., the MUD profile of the device is missing). When MUD profiles of device are known (i.e., present), all devices except the WeMo switch converge to the correct winner. Surprisingly, the WeMo switch is consistently identified as the WeMo motion—even the static similarity increases to 0.96. This is because both WeMo motion and WeMo switch share the same cloud-based endpoint for their Internet communications in data 2016, but these endpoints have changed for the WeMo switch (but not for the WeMo motion) in data 2018. It is important to note that the primary objective is to secure IoT devices by enforcing tight access-control rules to network elements. Therefore, the WeMo switch can be protected by the rules of the WeMo motion until it is updated to the latest firmware. Once the WeMo switch is updated, the intrusion detection process may generate false alarms, indicating the need for re-identification.

Figure 25:
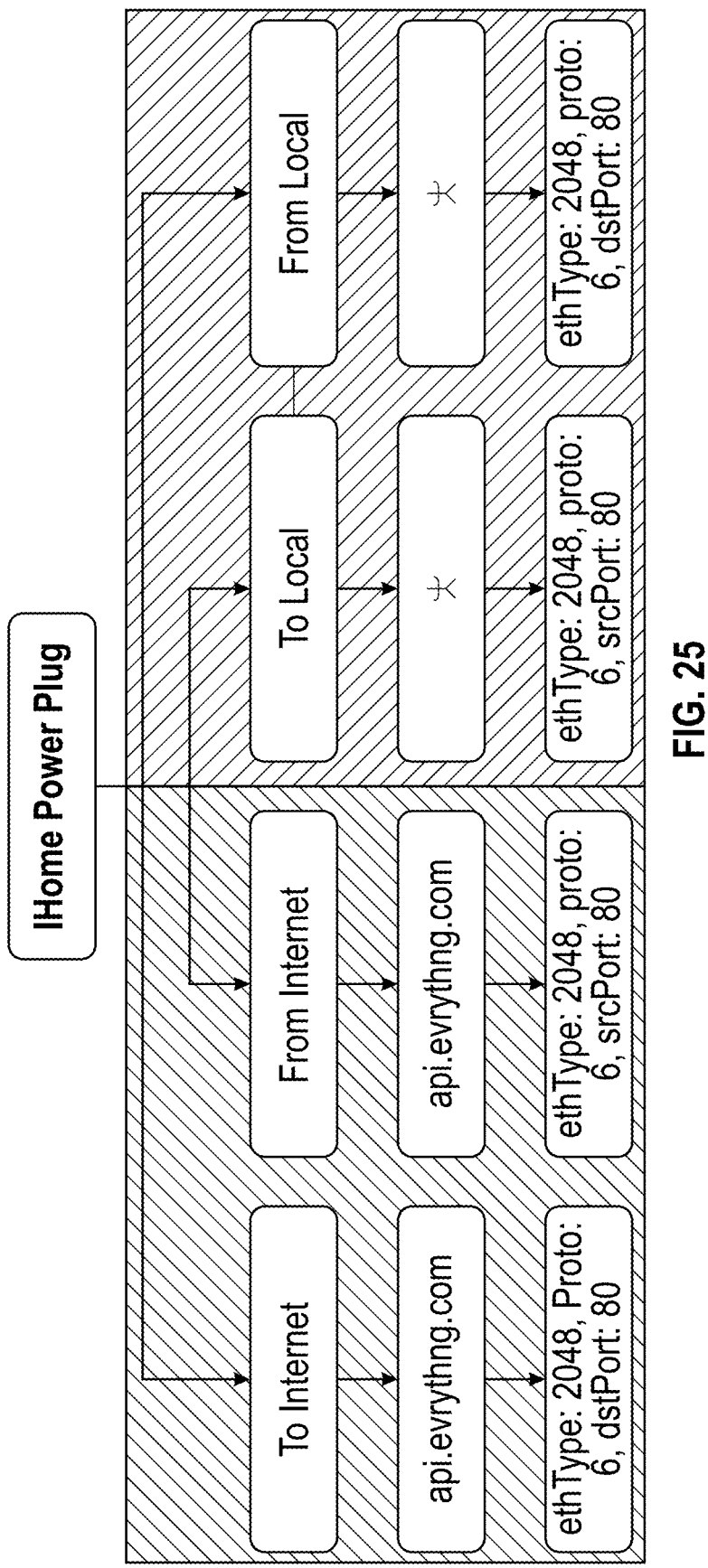
FIG. 25 is a schematic representation of a profile difference tree structure for an iHome IoT device.

It is observed that devices with profile changes are found in state-3 or state-4. In order to better understand the reason for a low score in dynamic similarity, the profile difference can be visualized in the form of a tree structure. For example, this difference (i.e., R-M) is shown in FIG. 25 for the iHome power plug IoT device. It can be seen that this device (in data 2016) communicates over HTTP with "api.evrything.com", and serves HTTP to the Local network. However, these communications do not exist in the MUD profile for the device (generated from data 2018). This difference may indicate to a network operator that a firmware upgrade is needed or that the MUD profile (offered by the manufacturer) is not complete.

Figure 26:
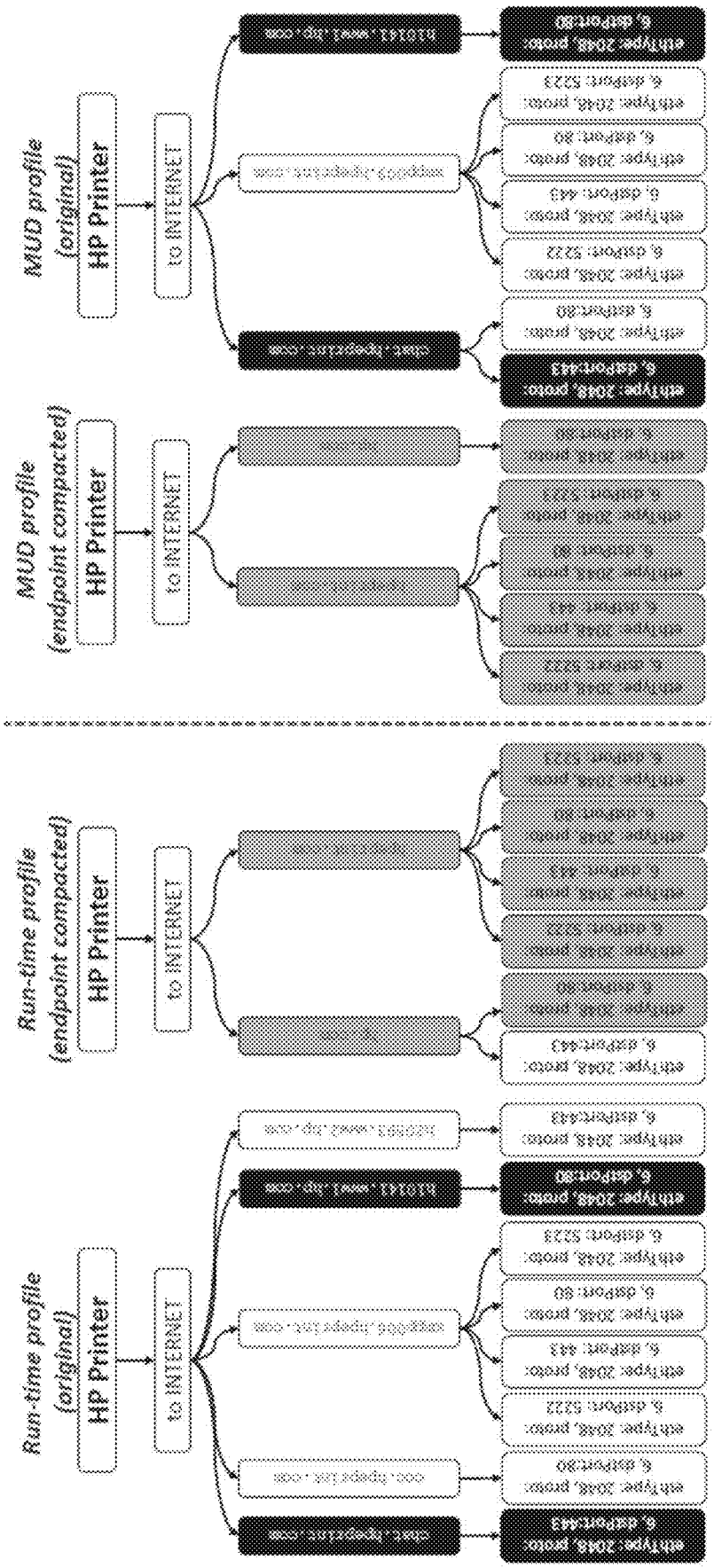
FIG. 26 is a schematic representation illustrating endpoint compaction for an HP printer IoT device (for the "to Internet" channel direction)

Some devices (e.g., the HP printer and the Hue bulb) may be found consistently in state-4 throughout the identification process. Structural variations in the profile can arise largely due to changes in the endpoints or port numbers. Tracking changes in port numbers is non-trivial. However, for endpoints fully qualified domain names can be compacted to primary domain names (i.e., removing sub-domain names). If the device is under attack or compromised, it likely communicates with a completely new primary domain. FIG. 26 illustrates endpoint compaction in an HP printer profile just for the "to INTERNET" channel direction. For this Mirai infected device scans random IP addresses on the Internet to find open ports TCP 23 and TCP 2323 for telnet access.

TABLE 5

List of Attacks launched against IoT devices (L: Local, D: Device, I: Internet)

| Attacks | | WeMo motion | WeMo switch | Belkin cam | Samsung cam | L→D | L→D→L | L→D→I | I→D→I | I→D→L | I→D |
|---|---|---|---|---|---|---|---|---|---|---|---|
| Reflection | SNMP | | | | ✓ | | ✓ | ✓ | ✓ | | |
| | SSDP | ✓ | | ✓ | | | ✓ | ✓ | ✓ | | |
| | TCP SYN | ✓ | ✓ | ✓ | ✓ | | ✓ | | | ✓ | |
| | Smurf | ✓ | ✓ | ✓ | ✓ | | ✓ | ✓ | | | |
| Direct | TCP SYN | ✓ | ✓ | ✓ | ✓ | ✓ | | | | | ✓ |
| | Fraggle | ✓ | ✓ | ✓ | ✓ | ✓ | | | | | ✓ |
| | ICMP | ✓ | ✓ | ✓ | ✓ | ✓ | | | | | |
| | ARP spoof | ✓ | ✓ | ✓ | ✓ | ✓ | | | | | |
| | Port Scan | ✓ | ✓ | ✓ | ✓ | ✓ | | | | | | channel direction and without endpoint compaction, the static and dynamic similarity scores are 0.28 and 0.25, respectively. Applying endpoint compaction results in high scores of 1 and 0.83 for static and dynamic similarities, respectively.

Endpoint compaction was applied to all of the IoT devices in the data 2016 dataset, and the results are shown under the column labelled "Endpoint compacted" in Table 4. Interestingly, this technique has significantly enhanced the identification: all state-4 devices become state-1 devices. An interesting observation here is the unknown MUD scenario for the WeMo motion detector, where the rate of incorrect identification (as WeMo switch) is fairly high, at 27.3%. However, it is not at all surprising to see different IoT devices from the same manufacturer identified as each other when compacting endpoints.

To summarize, if the identification process does not converge (or evolves very slowly), then the difference visualization and endpoint compaction described above enables network operators to discover IoT devices running old firmware.

Attacked or Compromised Device

The efficacy of the process when IoT devices are under direct/reflection attacks or compromised by a botnet was also evaluated, using traffic traces collected from the testbed in November 2017 ("data 2017"), and including a number volumetric attacks spanning reflection-and-amplification (SNMP, SSDP, TCP SYN, and Smurf), flooding (TCP SYN, Fraggle, and Ping of death), ARP spoofing, and port scanning launched on four IoT devices, namely the Belkin Netcam, the WeMo motion sensor, the Samsung smart-cam and the WeMo switch (listed in Table 5 below). These attacks were sourced from within the local network and from the Internet. For the Internet sourced attacks, port forwarding was enabled (emulating a malware behaviour) on the network gateway.

Figure 27:
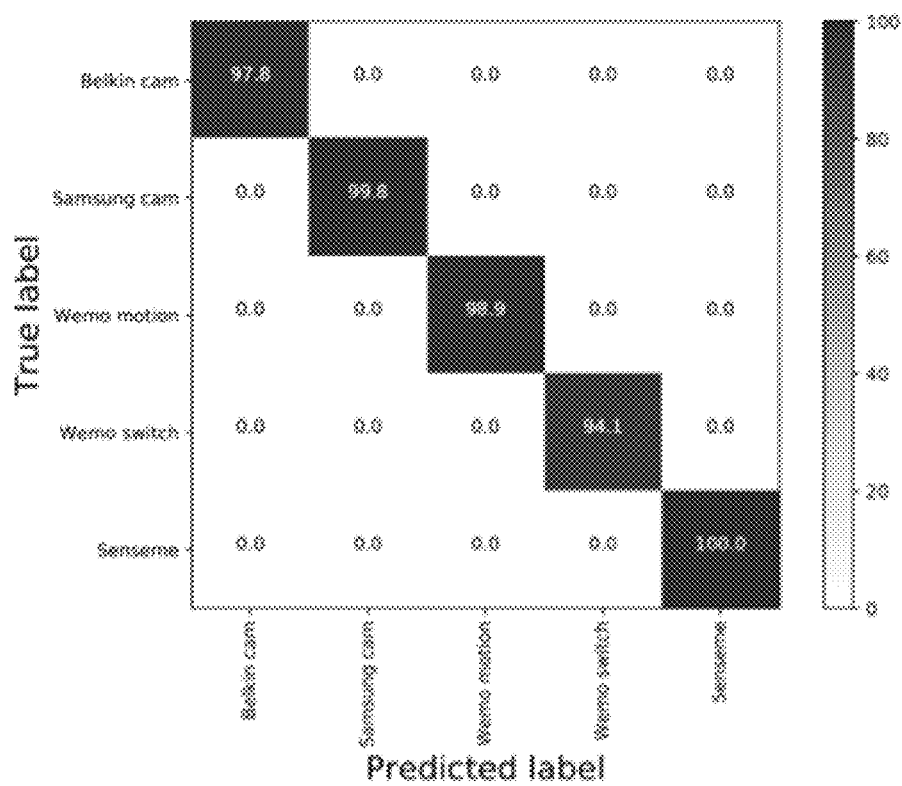
FIG. 27 is a partial confusion matrix showing the relationship between true and predicted labels of five different IoT devices.

Since the IoT devices in the testbed are all invulnerable to botnets, the inventors built a custom IoT device named "Senseme" using an Arduino Yun communicating with an open-source WSO2 IoT cloud platform. This device included a temperature sensor and a lightbulb. The Senseme device was configured to periodically publish the local temperature to the server, and its lightbulb was remotely controlled via the MQTT protocol. First the MUD profile of this device was generated, and then it was deliberately infected by the Mirai botnet. In order to avoid harming others on the Internet, the injection module of the Mirai code was disabled so that only its scanning module was used. A The identification process with thresholding was applied to data 2017, and it identified all devices correctly with high static similarity and low dynamic similarity (i.e., high variations). A partial confusion matrix of the identification is shown in FIG. 27. Since the MUD profile of Senseme is fairly simple in terms of branch count, it quickly converges to the winner with a high static similarity score, whereas other devices require more time to converge. Therefore, the success rate for identifying Senseme device is higher than for other devices.

Figure 28:
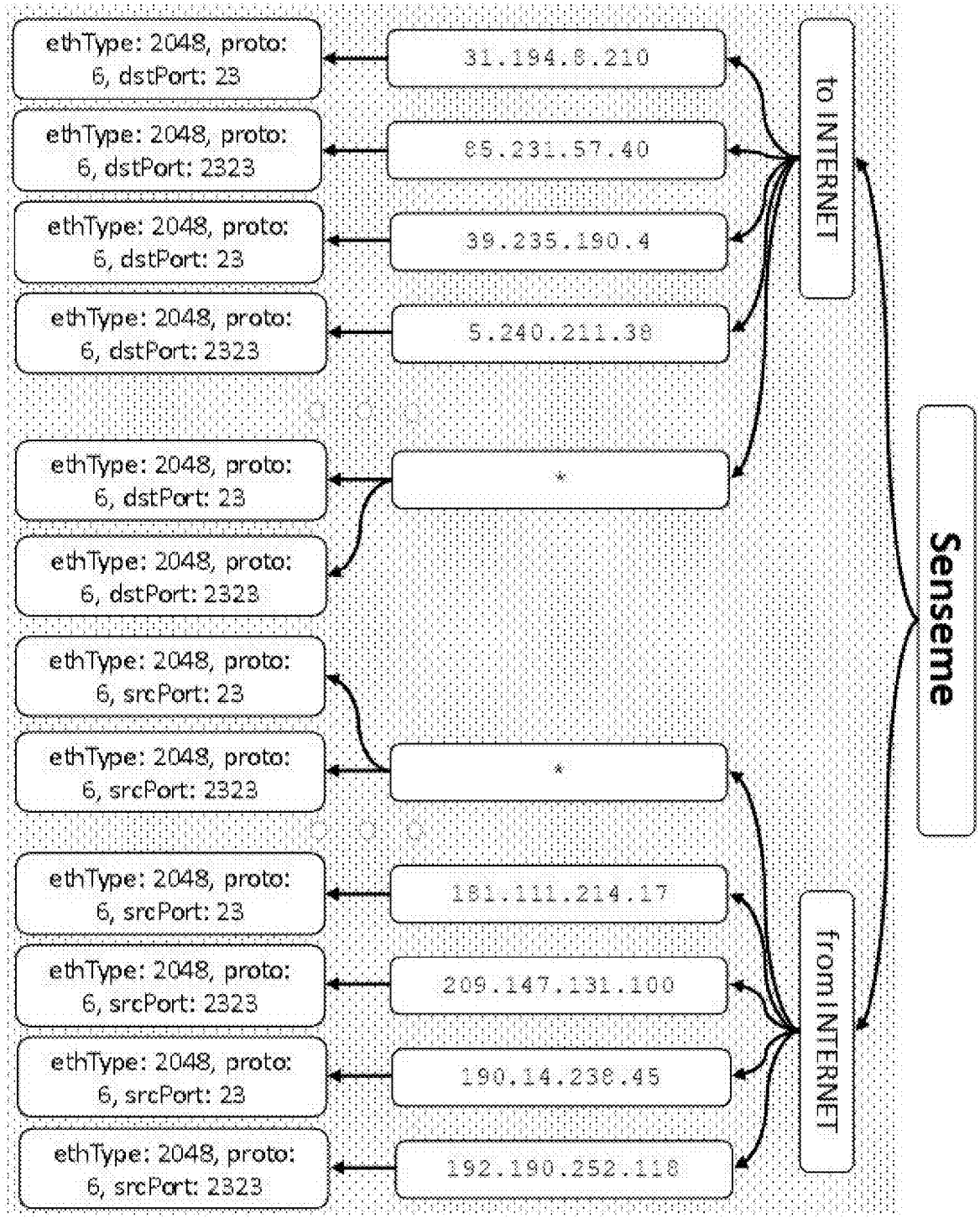
FIG. 28 is a schematic representation of a profile difference for a constructed "Sense-me" IoT device infected by the Mirai botnet virus.

Different attacks have different impacts on the run-time profiles of IoT devices. For example, ARP spoof and TCP SYN would not create a new branch in the tree structure of the device profile, and consequently no variation is captured. Fraggle, ICMP, Smurf, SSDP, and SNMP attacks would result only two additional flows, meaning a minor variation is captured. However, Port scans (botnet included) cause a large variation, since an increasing number of endpoints emerge in the tree structure at run-time. For example, the Mirai botnet scans 30 IP addresses per second, causing the dynamic similarity score to approach 0. FIG. 28 shows the profile difference (or variation) for the infected Senseme device at run-time.

Performance of Monitoring Profiles

The performance of the process for real-time monitoring of IoT behavioral profiles was quantified by four metrics, namely: convergence time, memory usage, inspected packets, and number of flows.

Convergence time: Convergence time depends on user interaction with the device, the type of the device, and the similarity score thresholds. Some devices do not communicate unless the user interacts with the device (e.g., the blipcare BP meter), devices like the Awair air quality sensor and the WeMo motion sensor do not require any user interaction, and devices such as cameras have many communication patterns, such as device to device, device to Internet server and remote communication. Therefore convergence times will vary based on the types of devices in the deployment.

Table 6 below lists the IoT devices and the times it took to converge to the correct device. All the devices in the 2018 dataset converged to the correct device within a day. One possible reason for this is that during the data collection, user interaction with the mobile application was programmed using a touch replay tool (i.e., turning on the Hue lightbulb, checking the live camera view) in a Samsung galaxy tab, and the user interaction was replayed every 6 hours. Therefore a significant number of states of the device was captured due to these interactions, whereas with the 2017 dataset it took 2 days. The shaded cells for the 2016 data set are the devices that converged due to endpoint compaction. Other than the Netatmo camera, all other devices only converged due to compaction. For the Netatmo camera, it took 4410 minutes to converge when endpoint compaction was not applied; however due to endpoint compaction it converged within 1650 minutes.

The Smart things, Hue bulb and Amazon echo IoT devices took a considerable time to converge. When the data was analysed, it was found that all 3 devices captured few flows due to an interaction from the first few minutes, and then it was stale until close to the convergence time.

Three limits for the monitoring time were used, in chronological order: the first is a time limit for convergence with thresholding, then a time limit for convergence whilst compaction, and lastly a time limit to stop monitoring.

TABLE 6

Convergence times in minutes for each dataset

| Device | Data-2018 | Data-2017 | Data-2016 |
|---|---|---|---|
| Amazon Echo | 15 | — | 38355 |
| August doorbell | 60 | — | 45 |
| Awair air quality | 30 | — | 15 |
| Belkin camera | 15 | 1065 | 105 |
| Blipcare BPmeter | 15 | — | 15 |
| Canary camera | 15 | — | 15 |
| Chromecast | 15 | — | — |
| Dropcam | 360 | — | 15 |
| Hello barbie | 15 | — | 15 |
| HP printer | 105 | — | 15 |
| Hue bulb | 15 | — | 9315 |
| iHome powerplug | 15 | — | 165 |
| LiFX bulb | 15 | — | 15 |
| Nest smoke | 15 | — | 15 |
| Netatmo camera | 360 | — | 1650 |
| Netatmo weather | 15 | — | 15 |
| Pixstar photoframe | 15 | — | 15 |
| Ring doorbell | 30 | — | 45 |
| Samsung smartcam | 15 | 525 | 15 |
| Smart Things | 360 | — | 13785 |
| TPlink camera | 30 | — | 15 |
| TPlink plug | 30 | — | 15 |
| Triby speaker | 15 | — | 330 |
| WeMo motion | 15 | 360 | 15 |
| WeMo switch | 15 | 2820 | 15 |
| Withings cardio | 15 | — | — |
| Withings sleep | 15 | — | — |
| Senseme | — | 15 | 15 |

System performance: In order to quantify the performance of the apparatus, the following four metrics were calculated: the average number of inspected packets, the average number of flows, the average number of nodes in the device profile tree, and the computation time for the compaction of the tree, redundancy removal and similarity score calculation. The average number of flows is an important metric for the operation of a hardware switch with limited TCAM capacity, and the other 3 metrics are relevant to the scalability of the process.

As shown in Table 6, the average number of flows for each device is typically fewer than 10, with the largest flow count of about 20 for the August doorbell. This range of flow counts is easily manageable in an enterprise network setting with switches that are capable of handling millions of flow entries. However, in home networks with routers that can accommodate up to hundreds of flows, it may be necessary to limit the IoT monitoring process to only a few devices at a time, in order to manage the TCAM constraint.

Regarding the number of packets inspected, it is clear that the IoT monitoring process is very effective by keeping the number of inspected packets to a minimum (e.g., mostly less than 10 packets per minute for each device). The computing time of the process solely depends on the number of nodes and the number of known MUD profiles. The time complexity of the process can be expressed as $O(n:m: \log n)$, where n is the number of branches in the profile tree and m is the number MUD profiles we are checking against. The time complexity for the search space was reduced by employing standard hashing and binary search tree techniques know to those skilled in the art. For a Chromecast device as an example, the average computing time is 5:20 ms, where there are on average 346 nodes in its run-time profile. This can be further improved by using parallelization, whereby similarity scores are computed over individual branches. It is important to note that the computing time is upper-bounded by setting an upper bound limit on the count of tree branches generated at run-time.

Lastly, in terms of space, 40 Bytes of memory is required for each node of a tree. This means that for Chromecast, on average, less than 14 KB of memory is needed. Additionally, all known MUD profiles are present in memory. Therefore, the space complexity heavily depends on the number of MUD profiles being checked.

TABLE 7

Performance metrics for the 2018 data set.

| Device | inspected pkts/min | flows/min | nodes/min | computing time (ms) |
|---|---|---|---|---|
| Amazon Echo | 6.58 | 13.72 | 68.83 | 1.38 |
| August doorbell | 13.44 | 20.11 | 65.84 | 1.71 |
| Awair air quality | 0.25 | 7.14 | 14.98 | 0.38 |
| Belkin camera | 5.79 | 16.26 | 65.3 | 0.95 |
| Blipcare BPmeter | 9 | 9 | 7 | 0.01 |
| Canary camera | 3.27 | 13.51 | 25.51 | 0.65 |
| Chromecast | 10.1 | 13.05 | 346.65 | 5.2 |
| Dropcam | 0.04 | 7.02 | 17.87 | 0.45 |
| Hello barbie | 3.72 | 5.86 | 9.52 | 0.72 |
| HP printer | 2.12 | 5.05 | 38.63 | 0.74 |
| Hue Bulb | 2.43 | 9.75 | 40.3 | 0.89 |
| ihome powerplug | 0.79 | 6.87 | 16.99 | 0.49 |
| lifx bulb | 1.6 | 8.65 | 18.86 | 0.50 |
| Nest smoke | 27 | 5.3 | 65.7 | 1.55 |
| Netatmo camera | 0.98 | 8.35 | 67.96 | 1.2 |
| Netatmo weather | 11.13 | 5.04 | 9 | 0.26 |
| Pixstar photoframe | 2.62 | 5.05 | 16.88 | 0.34 |
| Ring doorbell | 2.39 | 5.02 | 25.94 | 0.43 |
| Samsung smartcam | 1.34 | 10.37 | 209.98 | 2.0 |
| Smart Things | 3.2 | 7.5 | 13.96 | 0.27 |
| TPlink camera | 2.67 | 5.74 | 122.27 | 1.44 |
| TPlink plug | 3.96 | 5.07 | 26.49 | 0.51 |
| Triby speaker | 4.19 | 5.39 | 41.8 | 0.75 |
| WeMo motion | 10.66 | 14.76 | 213.59 | 2.97 |
| WeMo switch | 4.46 | 6.54 | 225.99 | 5.20 |
| Withings cardio | 11 | 5.57 | 9 | 0.15 |
| Withings sleep | 27 | 21 | 22 | 0.01 |

Many modifications will be apparent to those skilled in the art without departing from the scope of the present invention.

The invention claimed is:

1. A method for monitoring Internet of Things (IOT) devices comprising:
   generating at least one runtime profile from one or more network traffic flows of one or more IoT devices, wherein the at least one runtime profile comprises at least one graph data structure based on metadata extracted from the one or more network traffic flows, and wherein at least one of the one or more IoT devices lacks a manufacturer provided profile that satisfies an IoT standard;

calculating a similarity score between the at least one runtime profile and at least one reference profile corresponding to an IoT device that includes a manufacturer provided profile that satisfies the IoT standard, wherein the similarity score is a measure of similarity between the at least one graph data structure of the at least one runtime profile and at least one graph data structure of the at least one reference profile based on metadata extracted from one or more reference traffic flows; and adjusting an access control list restriction of the at least one of the one or more IoT devices based at least in part on the similarity score.

2. The method of claim 1, wherein the at least one reference profile is at least one of: a static profile or a dynamic profile.

3. The method of claim 1, wherein the metadata extracted from the one or more network traffic flows comprises at least one of: transport layer protocol data, network layer protocol data, or data link layer protocol data.

4. The method of claim 3, wherein the transport layer protocol data comprises at least one of: Transmission Control Protocol data, User Datagram Protocol data, or Stream Control Transmission Protocol data.

5. The method of claim 1, wherein the metadata extracted from the one or more network traffic flows comprises header data.

6. The method of claim 5, wherein the header data includes at least one of: transport layer protocol metadata, transport layer service number or port number metadata, network layer protocol metadata, or network layer endpoint metadata.

7. The method of claim 1, wherein the at least one reference profile is based at least in part on a Manufacturer Usage Description (MUD) specification.

8. The method of claim 7, wherein the at least one reference profile includes a pointer to a location where the at least one reference profile is stored.

9. The method of claim 1, wherein the similarity score is at least one of: a dynamic similarity score or a static similarity score.

10. The method of claim 1, wherein the similarity score is based on a comparison of a graph data structure of at least one runtime profile of an unknown IoT device with a graph data structure of at least one reference profile.

11. The method of claim 1, wherein generating the at least one runtime profile from the one or more network traffic flows of the one or more IoT devices comprises:

generating at least one runtime profile based on one or more transport layer protocols or transport layer services, including network traffic that flows to and from each of the one or more IoT devices.

12. The method of claim 11, wherein the network traffic that flows to and from each of the one or more IoT devices comprises:

network traffic flows for both local network and internet channels.

13. The method of claim 1, wherein generating the at least one runtime profile from the one or more network traffic flows of the one or more IoT devices further comprises:

updating at least one existing runtime profile based on one or more network traffic flows.

14. The method of claim 1 further comprising:

organizing the at least one runtime profile into a tree-like data structure including at least one set of nodes, wherein each node includes at least one categorical attribute relating to at least one of: an edge node, a channel of network flow, or a direction of network flow.

15. The method of claim 14 wherein the at least one categorical attribute comprises header data including at least one of: transport layer metadata, network layer metadata, or datalink layer metadata.

16. The method of claim 1 wherein calculating the similarity score between the at least one runtime profile and the at least one reference profile comprises:

calculating a static similarity score as follows $$sim_s(R, M_i) = \frac{|R \cap M_i|}{|M_i|}$$

wherein R represents at least one generated runtime profile following removal of any redundant rules, and Mi represents at least one reference profile based at least in part on the metadata extracted from one or more reference traffic flows.

17. The method of claim 1 wherein calculating the similarity score between the at least one runtime profile and the at least one reference profile comprises:

calculating a dynamic similarity score as follows $$sim_d(R, M_i) = \frac{|R \cap M_i|}{|R|},$$

wherein R represents the at least one runtime profile following removal of any redundant rules, and Mi represents the at least one reference profile based at least in part on the metadata extracted from one or more reference traffic flows.

18. The method of claim 1 further comprising:

determining whether the at least one runtime profile of the IoT device conforms to expected behavior based on the similarity score.

19. A method for monitoring Internet of Things (IOT) devices comprising:

monitoring one or more network traffic flows of one or more IoT devices;

generating at least one flow rule based on the one or more network traffic flows, wherein the at least one flow rule includes at least one matching field in at least one of: transport layer metadata, network layer metadata, or data link layer metadata;

processing the at least one flow rule to generate at least one runtime profile for a first IoT device, wherein the at least one runtime profile is based at least in part on a Manufacturer Usage Description (MUD) specification, and wherein the first IoT device lacks a manufacturer provided profile that satisfies the MUD specification;

organizing the at least one runtime profile into at least one tree-like data structure including a set of nodes, wherein each node includes at least one categorical attribute relating to at least one of: a channel of network flow, or a direction of network flow; and adjusting an access control list restriction of the first IoT device based at least in part on a similarity score determined based on the at least one runtime profile and at least one reference profile corresponding to a second IoT device that includes a manufacturer provide profile that satisfies the MUD specification.

20. The method of claim 19, wherein the at least one tree-like data structure is built by extracting metadata from the one or more network traffic flows.

21. The method of claim 20, wherein the metadata comprises header data including at least one of transport layer protocol metadata, transport layer service number or port number metadata, network layer protocol metadata, or network layer endpoint metadata.

22. The method of claim 19, wherein the processing the at least one flow rule to generate at least one runtime profile for the one or more IoT devices, wherein the at least one runtime profile has a structure based at least in part on a Manufacturer Usage Description (MUD) specification further comprises:
implementing at least one runtime profile generator to generate the at least one runtime profile based at least in part on the at least one flow rule, wherein the at least one flow rule includes matching fields in at least one of: the transport layer metadata, the network layer metadata, or the data link layer metadata.

23. A system for monitoring Internet of Things (IOT) devices comprising:
a programmable switch configured to mirror network traffic flows of one or more IoT devices; and
electronic circuitry configured to:
generate at least one runtime profile of a first IoT device from one or more network traffic flows of the one or more IoT devices, wherein the first IoT device lacks a manufacturer provided profile that satisfies an IoT standard, wherein the at least one runtime profile comprises at least one graph data structure based on metadata extracted from the one or more network traffic flows;
calculate a similarity score between the at least one runtime profile and at least one reference profile corresponding to a second IoT device that includes a manufacturer provided profile that satisfies the IoT standard, wherein the similarity score is a measure of similarity between the at least one graph data structure of the at least one runtime profile and at least one graph data structure of the at least one reference profile based on metadata extracted from one or more reference traffic flows; and
adjust an access control list restriction of the first IoT device based at least in part on the similarity score.

24. A system for monitoring Internet of Things (IOT) devices comprising:
a programmable switch configured to mirror network traffic flows of one or more IoT devices; and
electronic circuitry configured to:
monitor one or more network traffic flows of the one or more IoT devices;
generate at least one flow rule based on the one or more network traffic flows, wherein the at least one flow rule includes at least one matching field in at least one of: transport layer metadata, network layer metadata, or data link layer metadata;
process the at least one flow rule to generate at least one runtime profile for a first IoT device, wherein the at least one runtime profile is based on a manufacturer usage description standard, and wherein the first IoT device lacks a manufacturer provided profile that satisfies the manufacturer usage description standard;
organize the at least one runtime profile into at least one tree-like data structure including a set of nodes, wherein each node comprises at least one categorical attribute relating to at least one of: a channel of network flow, or a direction of network flow; and
adjust an access control list restriction of the first IoT device based at least in part on a similarity score determined based on the at least one runtime profile and at least one reference profile corresponding to a second IoT device that includes a manufacturer provide profile that satisfies the manufacturer usage description standard.

25. A method for monitoring Internet of Things (IOT) devices comprising:
generating at least one runtime profile of a first IoT device from one or more network traffic flows of one or more IoT devices, wherein the at least one runtime profile comprises at least one graph data structure based on metadata extracted from the one or more network traffic flows, and wherein the first IoT device lacks a manufacturer provided profile that satisfies an IoT standard;
calculating a similarity score between the at least one runtime profile and at least one reference profile corresponding to a second IoT device that includes a manufacturer provided profile that satisfies the IoT standard, wherein the similarity score is a measure of similarity between the at least one graph data structure of the at least one runtime profile and at least one graph data structure of the at least one reference profile based on metadata extracted from one or more reference traffic flows;
determining whether the at least one runtime profile of the first IoT device conforms to expected behavior based on the similarity score; and
responsive to determining that the at least one runtime profile of the first IoT device does not conform to the expected behavior, generating an alert for presentation to a user.

26. The method of claim 25, further comprising adjusting an access control list restriction of the first IoT device based at least in part on the similarity score.

* * * * *